US007958328B2

(12) United States Patent
Nakamura

(10) Patent No.: US 7,958,328 B2
(45) Date of Patent: Jun. 7, 2011

(54) COMPUTER SYSTEM, STORAGE SYSTEM AND METHOD FOR SAVING STORAGE AREA BY INTEGRATING SAME DATA

(75) Inventor: Takaki Nakamura, Ebina (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/723,315

(22) Filed: Mar. 12, 2010

(65) Prior Publication Data

US 2010/0169568 A1 Jul. 1, 2010

Related U.S. Application Data

(63) Continuation of application No. 11/582,451, filed on Oct. 18, 2006, now Pat. No. 7,689,796.

(30) Foreign Application Priority Data

Sep. 5, 2006 (JP) ................................. 2006-240169

(51) Int. Cl.
*G06F 12/00* (2006.01)

(52) U.S. Cl. .. 711/165; 711/112; 711/170; 711/E12.001

(58) Field of Classification Search ........................ None
See application file for complete search history.

(56) References Cited

U.S. PATENT DOCUMENTS

| 5,761,678 | A  | 6/1998 | Bendert et al. |
| 6,535,891 | B1 | 3/2003 | Fisher et al.  |
| 7,188,228 | B1 | 3/2007 | Chang et al.   |

| 2003/0009619 | A1 | 1/2003  | Kano et al.    |
| 2003/0079100 | A1 | 4/2003  | Williams et al.|
| 2003/0182317 | A1 | 9/2003  | Kahn et al.    |
| 2004/0068637 | A1 | 4/2004  | Nelson et al.  |
| 2004/0260861 | A1 | 12/2004 | Serizawa et al.|
| 2006/0239089 | A1 | 10/2006 | Kawamoto       |
| 2007/0150694 | A1 | 6/2007  | Chang et al.   |

FOREIGN PATENT DOCUMENTS

| JP | 2003-015915 | 1/2003 |
| JP | 2004-127294 | 4/2004 |
| JP | 2004-528659 | 9/2004 |
| JP | 2005-011316 | 1/2005 |

OTHER PUBLICATIONS

Japanese Office Action in JP 2006-240169, dated Feb. 17, 2009 (in Japanese) and partial English language translation of same.

*Primary Examiner* — Kevin Verbrugge

(74) *Attorney, Agent, or Firm* — Antonelli, Terry, Stout & Kraus, LLP.

(57) ABSTRACT

Provided is a storage system capable of saving actually used physical storage areas and of achieving a high speed in write processing. There is disclosed a computer system including a server and a storage system, in which physical storage areas of a disk drive are managed for each one or more physical blocks of predetermined sizes, and allocation of one or more physical blocks to a plurality of logical blocks of predetermined sizes is managed, and the storage system stores data written in a first logical block in a first physical block allocated to the first logical block and allocates the first physical block to a second logical block where the same data as the data stored in the first physical block is to be written.

15 Claims, 17 Drawing Sheets

BLOCK ALLOCATION TABLE 216

| LOGICAL BLOCK NUMBER | PHYSICAL DEVICE NUMBER | PHYSICAL BLOCK NUMBER | COW |
|---|---|---|---|
|  |  |  |  |
|  |  |  |  |

BLOCK REFERENCE TABLE 217

| PHYSICAL DEVICE NUMBER | PHYSICAL BLOCK NUMBER | REFERENCE COUNTER |
|---|---|---|
|  |  |  |
|  |  |  |

COMPUTER SYSTEM, STORAGE SYSTEM AND METHOD FOR SAVING STORAGE AREA BY INTEGRATING SAME DATA

CROSS-REFERENCE TO RELATED APPLICATION

This application is a continuation of U.S. application Ser. No. 11/582,451, filed Oct. 18, 2006, now U.S Pat. No. 7,689, 796 and which application claims priority from Japanese application JP2006-240169 filed on Sep. 5, 2006, the contents of which are hereby incorporated by reference into this application.

BACKGROUND

This invention relates to a storage application and a storage system linked together to save a storage area in writing the same data.

As one of functions of the storage system, an automatic volume expansion technology has been disclosed (e.g., in JP 2003-15915 A). According to JP 2003-15915 A, in a volume pool constituted of a plurality of virtual volumes, no physical block is allocated to a block constituting a virtual volume immediately after creation of the virtual volume. When a use request (i.e., write I/O request or the like) is actually issued afterwards, a physical block is allocated from the volume pool to a target block of the use request. The automatic volume expansion technology makes it possible to reserve a sufficient size of the virtual volume, and to set a size of the volume pool to a proper size, and an administrator only needs to basically monitor the availability of the volume pool, avoiding virtual volume capacity expansion work. This technology is called allocation on use (AOU).

Such the virtual volume uses almost no capacity of a physical volume at the time of starting to use the volume. At the time of starting to use the volume, certain initialization processing is usually carried out by the storage application. For example, a file system executes file system creation processing (mkfs) as initialization processing. A logical volume manager executes volume group creation processing (vgcreate) as initialization processing. Through such the initialization processing, metadata indicating contents of volume construction information is written in the volume. Accordingly, the volume immediately after the initialization processing uses the capacity of the physical volume. In particular, the amount of volume construction information often depends on a volume size. Thus, a large-capacity volume consumes a certain amount of a physical volume capacity even while it is not really used.

JP 2005-11316 A discloses a technology of setting a volume allocation size immediately after initialization processing to be smaller than the volume allocation size during operation, in consideration of the fact that each writing size of the metadata is smaller than user data. With such the technology, it is possible to reduce a use capacity of the physical volume immediately after initialization.

SUMMARY

According to JP 2005-11316 A, by allocating no physical area to an unused area of the virtual volume, and by reducing an allocation unit, an unused portion of the allocated physical area is reduced to minimum. As a result, use efficiency of the capacity is increased.

In the initialization processing, data of the same contents is written repeatedly in most cases. However, according to the technology disclosed in JP 2003-15915 A, no consideration is given to the case where contents to be written are identical. Thus, it is necessary to reserve a physical area for each writing of the identical contents.

According to a representative aspect of this invention, there is provided a computer system, including: a server; and a storage system, in which: the server includes: an interface coupled to the storage system; a processor coupled to the interface; and a memory coupled to the processor; the storage system includes: a disk drive for storing data; and a controller for controlling the disk drive; the storage system manages a physical storage area of the disk drive for each one or more of physical blocks of predetermined sizes; the storage system manages allocation of one or more physical blocks to a plurality of logical blocks of predetermined sizes; the one or more physical blocks include at least one first physical block; the plurality of logical blocks include at least one first logical block and one or more second logical blocks; and the storage system stores data written in the first logical block in the first physical block allocated to the first logical block, and further allocates the first physical block to the second logical block in which the same data as that stored in the first physical block is to be written.

According to an embodiment of this invention, it is possible to complete the processing of repeatedly writing the same data in the plurality of areas, such the processing including the case of contents initialization processing or the case of copying, or volume initialization processing of the database or the logical volume manager. Moreover, according to this embodiment of this invention, it is possible to reduce the use amount of a physical volume when the same data is repeatedly written in the plurality of areas.

BRIEF DESCRIPTION OF THE DRAWINGS

FIG. 3 is an explanatory diagram showing a format of a block allocation table according to the first embodiment of this invention.

FIG. 4 is an explanatory diagram showing a format of a block reference table according to the first embodiment of this invention.

DETAILED DESCRIPTION OF THE PREFERRED EMBODIMENTS

Figure 1:
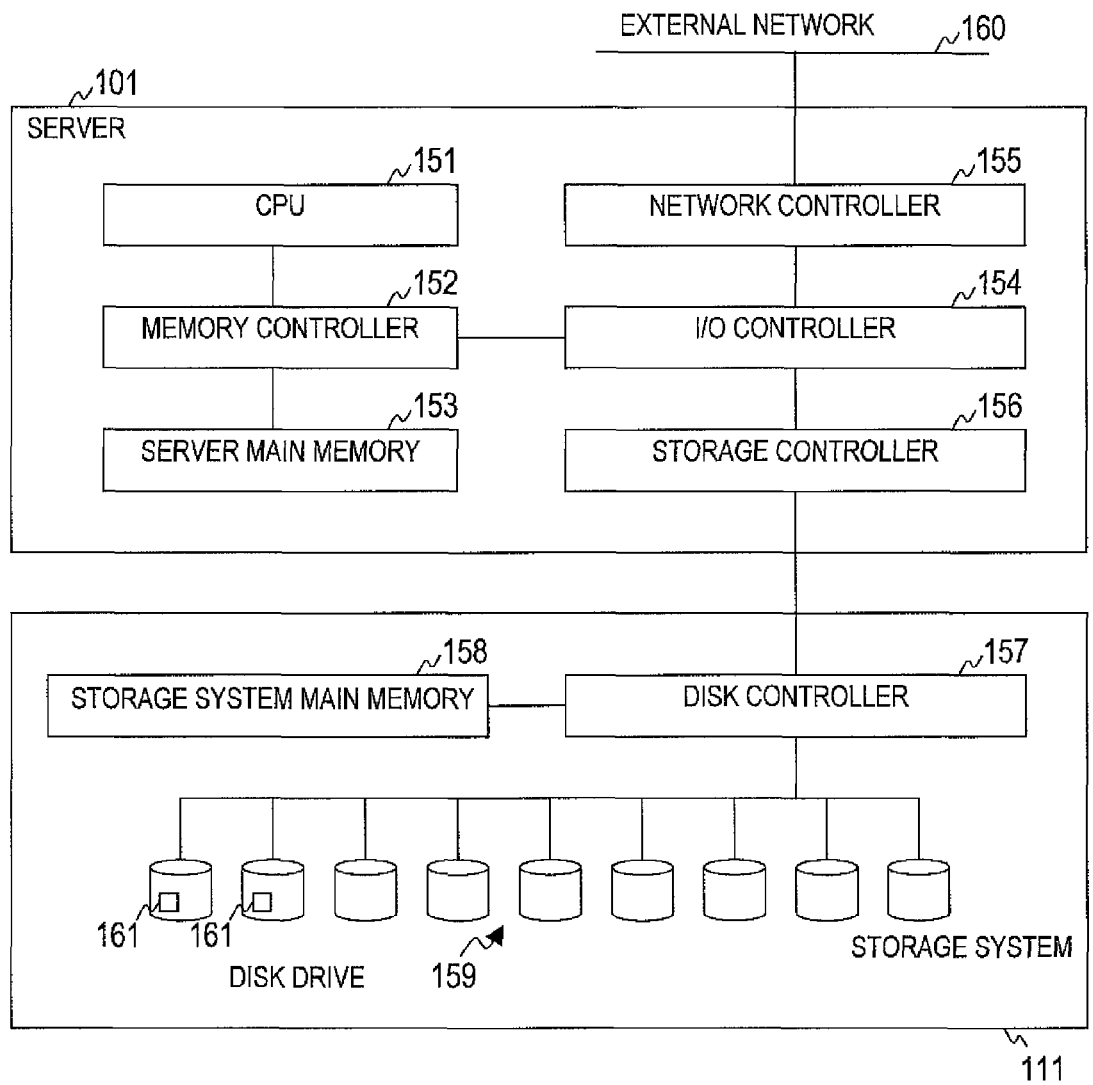
FIG. 1 is a block diagram showing a hardware configuration of a computer system according to a first embodiment of this invention.

FIG. 1 is a block diagram showing a hardware configuration of a computer system according to a first embodiment of this invention.

FIG. 1 shows a configuration where a server 101 and a storage system 111 are separate from each other. In this case, a storage controller 156 of the server 101 and a disk controller 157 of the storage system 111 are connected to each other through a fibre channel or the like. However, this invention is not limited to the form where the server 101 and the storage system 111 are separate from each other. For example, this invention can also be applied to a configuration where the server 101 is incorporated in the storage server 111. In this case, the server 101 and the storage system 111 are connected to each other through a dedicated bus or the like.

The server 101 shown in FIG. 1 may be a dedicated server such as a network attached storage (NAS).

The server 101 is a computer which includes a CPU 151, a memory controller 152, a server main memory 153, an I/O controller 154, a network controller 155, and the storage controller 156.

The memory controller 152 is connected to the CPU 151, the server main memory 153, and the I/O controller 154.

For example, the server main memory 153 is a semiconductor memory device for storing a program executed by the CPU 151 and information referred to when the program is executed.

The I/O controller 154 is further connected to the network controller 155 and the storage controller 156.

The network controller 155 is an interface connected to an external network 160. The external network 160 is, for example, a local area network (LAN), but may be of a network of another type. When the server 101 is a NAS server, a NAS client computer (not shown) may be connected to the external network 160.

The storage controller 156 is an interface connected to the disk controller 157 of the storage system 111 via a fibre channel or the like.

The storage system 111 includes the disk controller 157, a storage system main memory 158, and one or more disk drives 159.

The disk controller 157 connects the storage system main memory 158 to one or more disk drives 159. The disk controller 157 is a processor for executing a program stored in the storage system main memory 158 to process data I/O commands (i.e., write and read commands) to the disk drive 159. The disk drive 157 may include an interface (not shown) for communicating with the storage controller 156.

The storage system main memory 158 is, for example, a semiconductor memory device for storing a program executed by the disk controller 157 and information referred to when the program is executed.

The disk drive 159 is, for example, a hard disk drive, but may be another memory device (e.g., semiconductor memory device such as a flash memory). When the storage system 111 includes a plurality of disk drives 159, those disk drives may constitute a redundant arrays of inexpensive disks (RAID) structure.

The storage system 111 manages physical storage areas of the disk drive 159 for each physical block 161 of a predetermined size. FIG. 1 shows only two physical blocks 161. In reality, however, each disk drive 159 includes an optional number of physical blocks 161.

Figure 2:
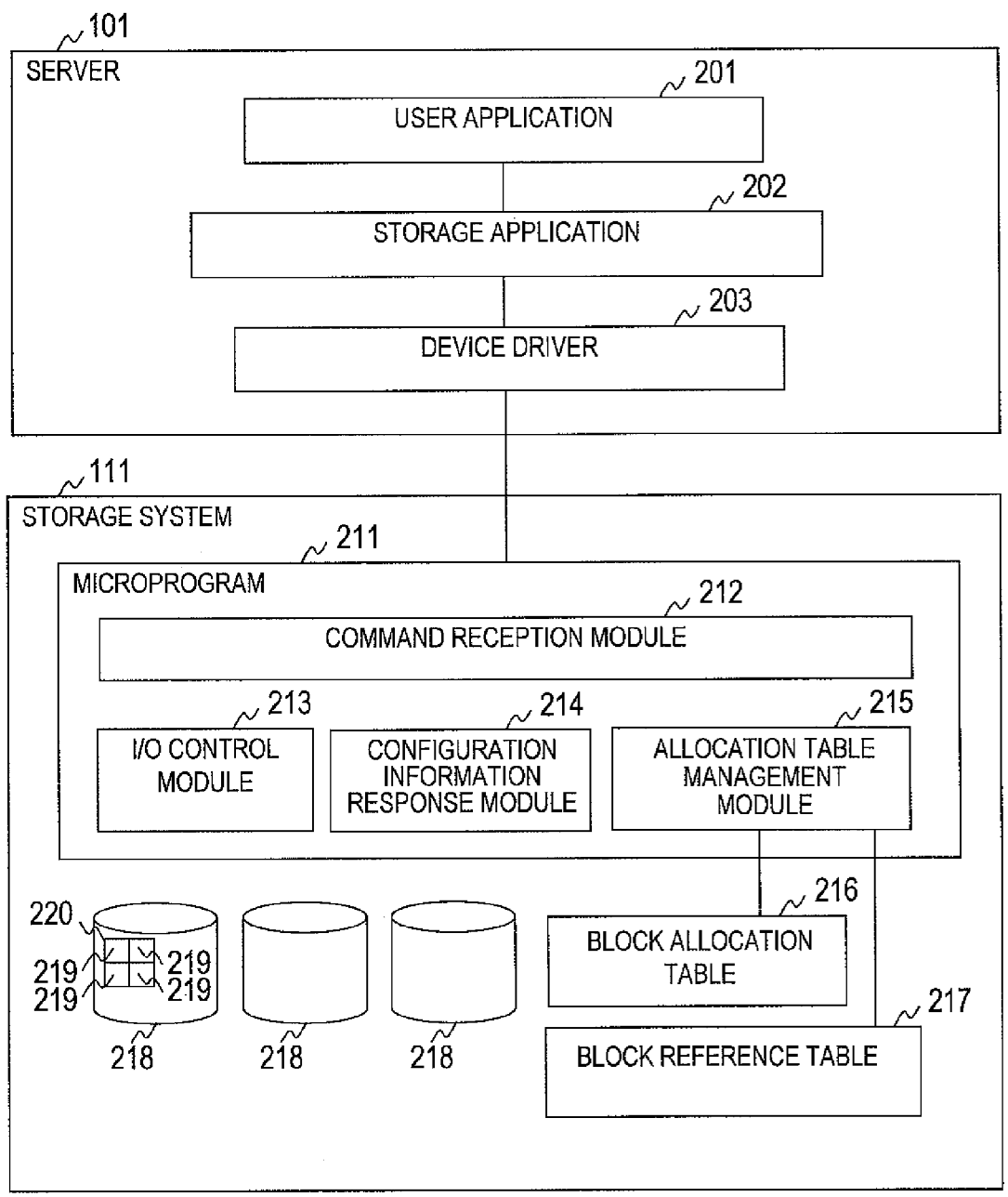
FIG. 2 is a functional block diagram of the computer system according to the first embodiment of this invention.

FIG. 2 is a functional block diagram of the computer system according to the first embodiment of this invention.

The server main memory 153 of the server 101 stores programs of a user application 201, a storage application 202, and a device driver 203. Those programs are executed by the CPU 151. In reality, other programs are stored in the server main memory 153 to be executed by the CPU 151. However, those programs are omitted because they have no relation with this invention.

The storage system main memory 158 of the storage system 111 stores a microprogram 211, a block allocation table 216, and a block reference table 217. The microprogram 211 is executed by the disk controller 157.

The block allocation table 216 and the block reference table 217 are referred to and updated by the microprogram 211 executed by the disk controller 157.

The microprogram 211 includes at least a command reception module 212, an I/O control module 213, a configuration information response module 214, and an allocation table management module 215. Programs of no relation to this invention are omitted.

The storage system shown in FIG. 2 further includes one or more volumes 218. Each volume 218 is a virtual storage area recognized as one storage device by the server 101.

Each volume 218 includes one or more logical blocks 219. The logical block 219 is a logical storage area of a predetermined size. FIG. 2 shows only four logical blocks 219. In reality, however, each volume 218 includes an optional number of logical blocks 219. A physical block 161 may be allocated to each logical block 219.

The storage system 111 manages physical storage areas of the disk drive 159 for each physical block 161 of a predetermined size, and receives an access request to the logical block 219 from the server 101. The storage system 111 manages allocation of the physical block 161 to the logical block 219.

In reality, data written in each logical block 219 from the server 101 is stored in a physical block 161 allocated to the logical block 219.

As described below, the allocation of the physical block 161 to the logical block 219 is managed for each allocation block 220. FIG. 2 shows a case where one allocation block 220 is constituted of four logical blocks 219. In reality, however, one allocation block 220 is constituted of one or more optional number of logical blocks 219. FIG. 2 shows only one allocation block 220. In reality, however, each volume 218 includes an optional number of allocation blocks 220.

Allocation on use (AOU) is applied to the volume 218 of this embodiment. Thus, when a write request targeting the logical block 219 in the volume 218 is first issued, the physical block 161 is allocated to the logical block 219.

FIG. 3 is an explanatory diagram showing a format of the block allocation table 216 according to the first embodiment of this invention.

The block allocation table 216 is generated for each volume 218. Each block allocation table 216 has an entry for each logical block number. Entries may be prepared in advance corresponding to all the logical blocks 219. Alternatively, when a physical block 161 is actually allocated to a logical block 219, an entry may be prepared corresponding to the logical block 219.

Each entry includes fields of a logical block number 301, a physical device number 302, a physical block number 303, and a COW bit 304.

The logical block number 301 is a number for identifying each logical block 219.

The physical device number 302 and the physical block number 303 uniquely identify the physical block 161 allocated to the logical block 219 identified by the logical block number 301. In other words, the physical device number 302 is a number for identifying a physical device to which the physical block 161 allocated to the logical block 219 belongs. The physical block number 303 is a number for identifying the physical block 161 allocated to the logical block 219 in the physical device indicated by the physical device number 302.

In other words, based on the block allocation table 216, it is possible to know which of the physical devices and which of the physical blocks 161 a certain logical block 219 corresponds to.

The physical device is a physical volume set as a management unit of a physical storage area. One or more disk drives 159 may constitute one physical device, or a part of a storage area of one or more disk drives 159 may constitute one physical device.

When one allocation block 220 includes a plurality of continuous logical blocks 219, a number of a head logical block 219 of each allocation block 220 may be registered in the logical block number 301. In this case, a plurality of continuous physical blocks 161 are allocated to the plurality of logical blocks 219 constituting the allocation block 220. In the physical device number 302 and the physical block number 303, information for identifying a head physical block 161 among the plurality of allocated continuous physical blocks 161 is registered.

In the COW bit 304, a value indicating allocation of a single physical block 161 to the plurality of logical blocks 219 is registered. The COW bit 304 is referred to when a write command is executed.

FIG. 4 is an explanatory diagram showing a format of the block reference table 217 according to the first embodiment of this invention.

The block reference table 217 has an entry for each physical block 161. Each entry includes fields of a physical device number 401, a physical block number 402, and a reference counter 403.

As in the case of the physical device number 302 and the physical block number 303 of FIG. 3, the physical device number 401 and the physical block number 402 uniquely identify each physical block 161.

In the reference counter 403, a value indicating how many logical blocks 219 the physical block 161, which is identified by the physical device number 401 and the physical block number 402, is allocated to is registered. When a value of the reference counter 403 is "0", a physical block 161 corresponding to the value is not allocated to any logical block 219. In other words, it is an unused block.

As in the case of the block allocation table 216, entries may be prepared in advance corresponding to all the physical blocks 161, or an entry corresponding to a physical block 161 may be prepared when the physical block 216 is actually allocated to the logical block 219.

Processing executed according to the first embodiment of this invention will be described below. In the following description, the storage system 111 has an AOU function. This is because effects of this embodiment are more conspicuous in the storage system 111 having the AOU function. However, this embodiment can be applied to a storage system where a volume is constituted of a block of a plurality of physical devices even while an AOU function is not provided. Second and third embodiments described below can similarly be applied to a volume having no AOU function.

According to the first embodiment of this invention, the storage application 202 obtains allocation configuration information, and issues a mapping update command to the storage system 111 based on the information, whereby writing of the same contents in the plurality of logical blocks 219 is aggregated in a single physical block 161.

Figure 5:
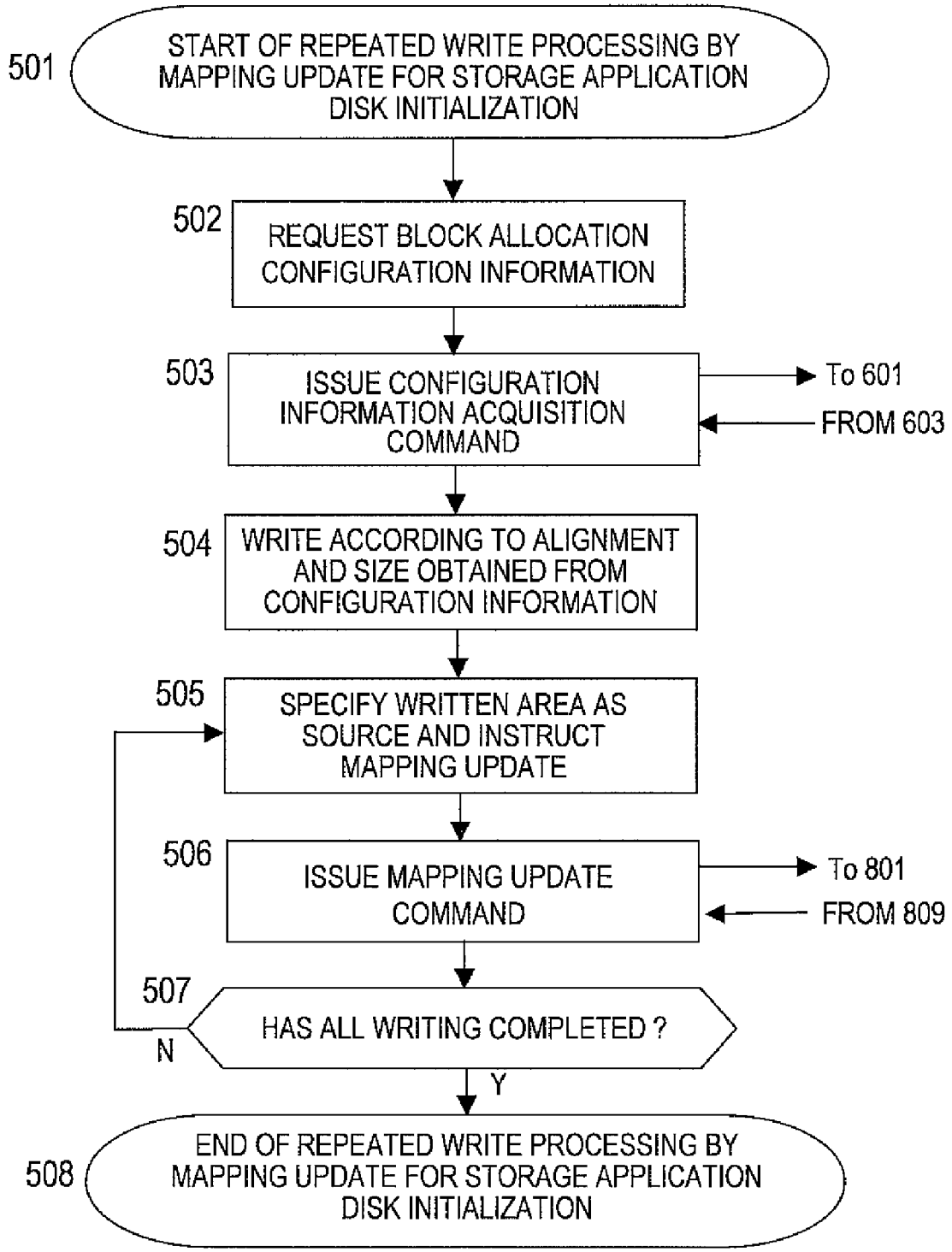
FIG. 5 is a flowchart showing processing executed by a server according to the first embodiment of this invention.

FIG. 5 is a flowchart showing processing executed by the server 101 according to the first embodiment of this invention.

Specifically, FIG. 5 shows processing executed to realize a state where the same initial data is written in a plurality of places of a volume 218.

First, the storage application 202 starts processing (501).

The storage application 202 requests block allocation configuration information to the device driver 203 (502).

The device driver 203 issues a configuration information acquisition command to the storage system 111 (503). Processing of the configuration acquisition command performed in the storage system 111 will be described below referring to FIG. 6.

Then, the storage application 202 executes writing of the initial data according to allocation alignment and an allocation size (described below) contained in the obtained configuration information (504). Processing of the step 504 is initial data writing processing performed with respect to a first place among the plurality of places to which the same initial data is to be written. As a result, the initial data is stored in the physical block 161 allocated to the logical block 219 of a writing target.

The allocation size and the allocation alignment will be described.

Allocation of the physical block 161 to the logical block 219 may be managed for each logical block 219, or for each group constituted of a plurality of logical blocks 219. Such an allocation management unit is called an allocation block 220. One allocation block 220 is constituted of a predetermined number of logical blocks 219. For example, one allocation block 220 may be constituted of one logical block 219, or an optional plural number of logical blocks 219.

The allocation size is information indicating a size of the allocation block 220, in other words, the number of logical blocks 219 included in each allocation block 220.

The allocation alignment is information indicating a head position of the allocation block 220.

The storage application 202 that has obtained the allocation size and the allocation alignment from the configuration information response module 214 can accurately know which logical block 219 belongs to which allocation block 220 based on the obtained information.

Next, the storage application 202 specifies an area where the data has been written in the step 504 as a source, and an area where the same contents as those of the source are to be written as a destination, and instructs the device driver 203 to update mapping (505). This instruction requests allocation of the physical block 161 allocated to the logical block 219 specified as the source to the logical block 219 specified as the destination while its allocation to the source is maintained.

In the step 505, the destination is specified based on the allocation size and the allocation alignment obtained in the step 503. Specifically, the destination is specified such that a positional relation between the logical block 219 specified as the destination and the head of the allocation block 220 matches that between the logical block 219 specified as the source and the head of the allocation block 220. It is because when those positional relations are different from each other, the same physical block 161 cannot be allocated to the source and the destination.

For example, when the logical block 219 specified as the source is a head of the allocation block 220, a head logical block 219 of another allocation block 220 is specified as a logical block 219 of a destination corresponding to the logical block 219.

Then, the device driver 203 issues a mapping update command to the storage system 111 (506). Processing of the mapping update command performed in the storage system 111 will be described below referring to FIG. 8.

Subsequently, for all the areas where the same contents are to be written, the steps 505 to 507 are repeated to complete the processing (508).

By omitting the repetition of the steps 505 to 507 of the flowchart of FIG. 5, it is possible to achieve a high speed for the processing. For this purpose, for example, a mapping update command with a plurality of destinations being specified, or a write command with a plurality of destinations being specified may be used.

Figure 6:
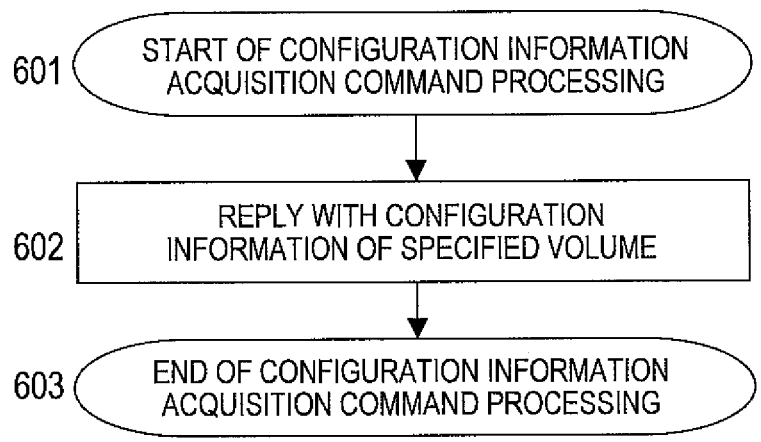
FIG. 6 is a flowchart showing configuration information acquisition command processing executed by a storage system according to the first embodiment of this invention.

FIG. 6 is a flowchart showing configuration information acquisition command processing executed by the storage system 111 according to the first embodiment of this invention.

The processing of FIG. 6 is executed by the storage system 111 which has received the configuration information acquisition command issued in the step 503 of FIG. 5.

Upon reception of the configuration information acquisition command by the command reception module 212, the configuration information acquisition command processing is started (601).

The configuration information response module 214 replies with configuration information of a specified volume, specifically, an allocation size and allocation alignment of the specified volume (602).

Thus, the configuration information acquisition command processing is finished (603).

Next, processing of the mapping update command, which is issued in the step 506 of FIG. 5, performed in the storage system 111 will be described referring to a command format of FIG. 7 and a flowchart of FIG. 8.

Figure 7:
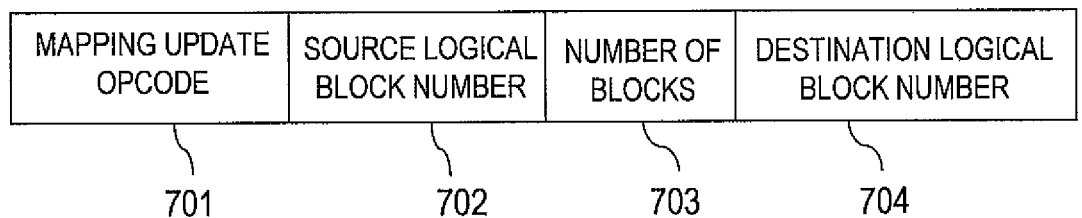
FIG. 7 is an explanatory diagram showing a format of a mapping update command according to the first embodiment of this invention.

FIG. 7 is an explanatory diagram of a format of the mapping update command according to the first embodiment of this invention.

A format 700 of the mapping update command includes a mapping update opcode 701, a source logical block number 702, the number of blocks 703, and a destination logical block number 704.

The mapping update opcode 701 is a code indicating that the command is a mapping update command. The source logical block number 702 and the destination logical block number 704 are respectively head logical blocks 219 of the areas specified as the source and as the destination in the step 505.

The number of blocks 703 is the number of continuous logical blocks 219 which become targets of mapping update. Specifically, the continuous logical blocks 219 indicated by the number of blocks 703, where the logical blocks 219 specified by the source logical block number 702 and the destination logical block number 704 are heads, are a target area of mapping update.

Figure 8:
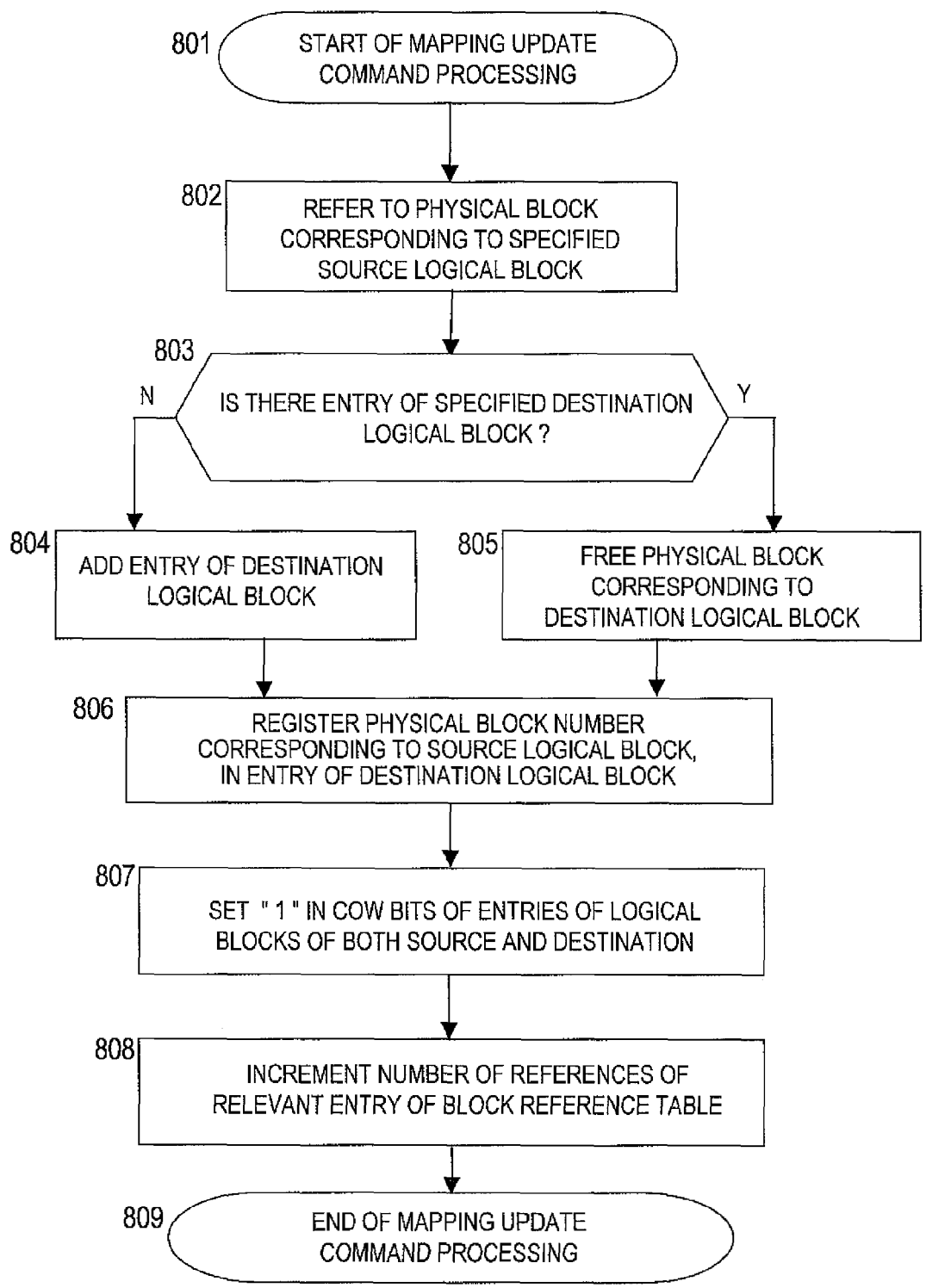
FIG. 8 is a flowchart showing mapping update command processing executed by an allocation table management module according to the first embodiment of this invention.

FIG. 8 is a flowchart showing mapping update command processing executed by the allocation table management module 215 according to the first embodiment of this invention.

Upon a start of the mapping update command processing (801), the allocation table management module 215 refers to the block allocation table 216 and obtains the physical block number 303 and the physical device number 302 corresponding to a specified source logical block number 301 (802).

Then, the allocation table management module 215 judges whether there is an entry corresponding to a specified destination logical block number in the block allocation table 216 (803).

When it is judged in the step 803 that there is no entry, no physical block 161 has been allocated to the destination logical block 219. In this case, the allocation table management module 215 adds an entry corresponding to the destination logical block 219 to the block allocation table 216 (804), and the process proceeds to a step 806.

On the other hand, when it is judged in the step 803 that there is an entry, a physical block 161 has been allocated to the destination logical block 219. In this case, the allocation table management module 215 frees the physical block 161 corresponding to the destination logical block 219 (805), and the process proceeds to the step 806.

In the step 806, the allocation table management module 215 registers a physical block number and a physical device number corresponding to the source logical block 219 in the entry of the destination logical block 219. As a result of executing the step 806, the physical block 161 that has been allocated to the source logical block 219 is also allocated to the destination logical block 219 while its allocation to the source logical block 219 is maintained. Thus, one physical block 161 is allocated to a plurality of logical blocks 219.

Then, the allocation table management module 215 registers "1" in COW bits 304 of entries of both of the source and the destination (807).

The allocation table management module 215 increments the reference counter 403 of relevant entry in the block reference table 217 (808) to finish the processing (809).

The above-described processing is repeated by the same number of times as the number of continuous blocks specified in the number of blocks 703, referring to the steps 505 to 507 of FIG. 5.

The mapping update command shown in FIG. 7 can specify only one destination for one source. However, by applying a command format for specifying a plurality of destinations for one source, it is possible to omit the repetition of the steps 505 to 507 of FIG. 5.

Figure 9:
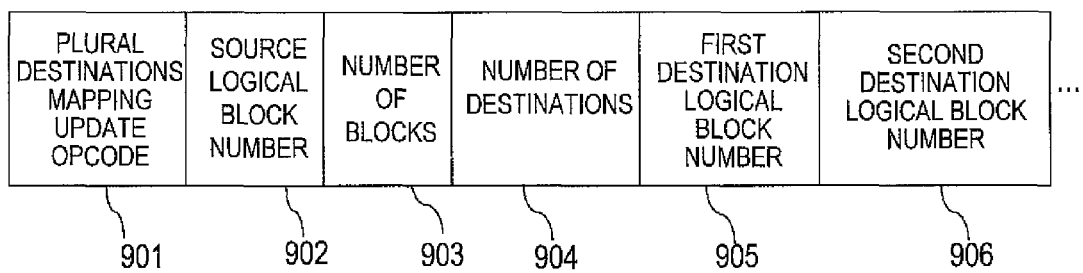
FIG. 9 is an explanatory diagram showing a format of a mapping update command specifying a plurality of destinations according to the first embodiment of this invention.

FIG. 9 is an explanatory diagram showing a format of the mapping update command for specifying the plurality of destinations according to the first embodiment of this invention.

A format 900 of the mapping update command shown in FIG. 9 includes a plural destinations mapping update opcode 901, a source logical block number 902, the number of blocks 903, the number of destinations 904, the number of destination logical block numbers 905 specified by the number of destinations 904, and the like.

The plural destinations mapping update opcode 901 is a code indicating that the command is a mapping update command specifying a plurality of destinations. As the source logical block number 902 and the number of blocks 903 are similar to the source logical block number 702 and the number of blocks 703, a description thereof will be omitted.

The number of destinations 904 indicates the number of destination areas which become targets of mapping update. An optional value can be set for the number of destinations 904.

The destination logical block number 905 or the like is a number of a head logical block 219 of each area specified as a destination. The format 900 includes the number of destination logical block numbers 905 or the like specified by the number of destinations 904. FIG. 9 shows a first destination logical block number 905 and a second destination logical block number 906 as examples. If "3" is set in the number of destinations 904, the format 900 further includes a third destination logical block number (not shown).

Next, reading and writing processings with respect to the volume 218 which are performed in the storage system 111 will be described.

Figure 16:
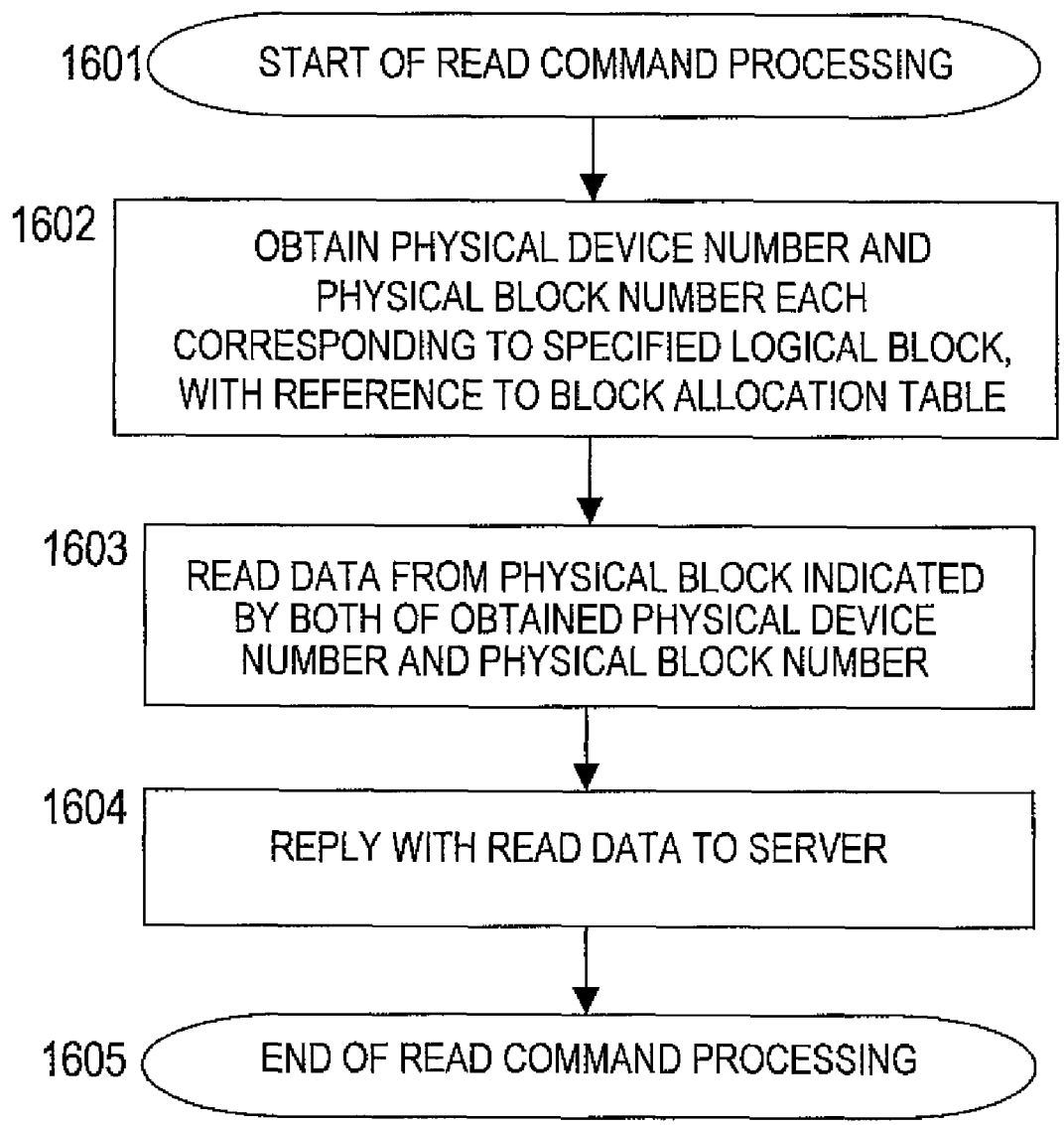
FIG. 16 is a flowchart showing read command processing executed by the storage system according to the first embodiment of this invention.

FIG. 16 is a flowchart showing read command processing executed by the storage system 111 according to the first embodiment of this invention.

Upon reception of a command for a read request (read command) from the server 101 by the storage system 111, the I/O control module 213 starts read command processing (1601). The read command specifies at least a logical block number indicating a target logical block of the read request.

First, the I/O control module 213 refers to the entry of block allocation table 216 corresponding to the logical block number 301 specified by the read command and obtains a physical device number 302 and a physical block number 303 (1602).

Then, the I/O control module 213 reads data stored in a storage area indicated by the physical device number 302 and the physical block number 303 obtained in the step 1602 (1603).

The I/O control module 213 returns the data read in the step 1603 to the server (1604), and finishes the read command processing (1605).

Figure 17:
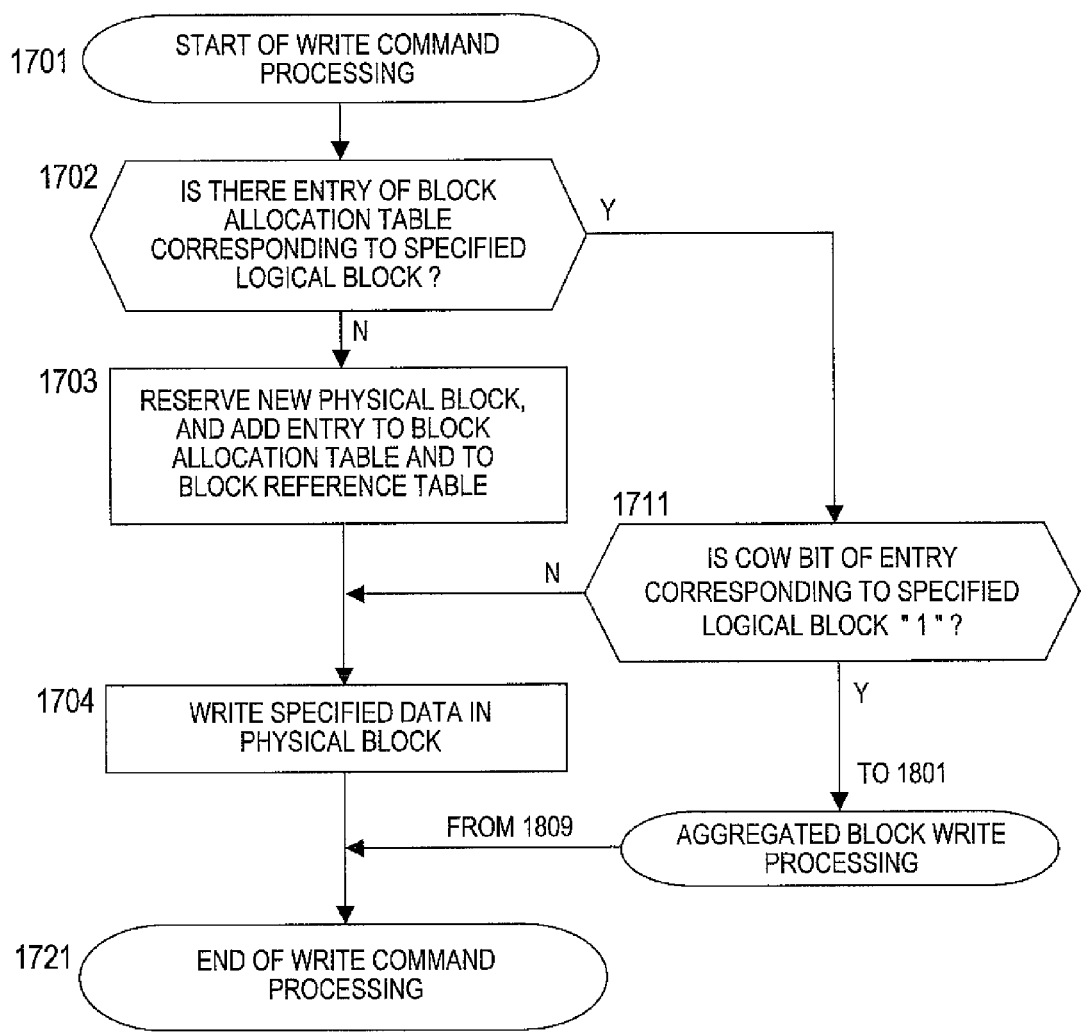
FIG. 17 is a flowchart showing write command processing executed by the storage system according to the first embodiment of this invention.

FIG. 17 is a flowchart showing write command processing executed by the storage system 111 according to the first embodiment of this invention.

Upon reception of a command for a write request (write command) from the server 101 by the storage system 111, the I/O control module 213 starts write command processing (1701). The read command specifies at least a logical block number indicating a target logical block of the write request, and target data of the write request (write data).

First, the I/O control module 213 judges whether there is an entry corresponding to the logical block 219 specified by the write command, in the block allocation table 216 (1702).

When it is judged in the step 1702 that there is no entry corresponding to the specified logical block 219, no physical block 161 has been allocated to the target logical block 219 of the write request. In this case, the process proceeds to a step 1703.

In the step 1703, the I/O control module 213 reserves a new physical block 161, and adds an entry corresponding to the reserved physical block to the block allocation table 216 and the block reference table 217. Then, the process proceeds to a step 1704.

On the other hand, when it is judged in the step 1702 that there is an entry corresponding to the specified logical block 219, a physical block 161 has been allocated to the target logical block 219 of the write request. In this case, the I/O control module 213 judges whether a COW bit 304 of the entry of the block allocation table 216 corresponding to the logical block 219 specified by the write command is "1" (1711).

When it is judged in the step 1711 that the COW bit 304 is "1", the physical block 161 that has been allocated to the target logical block 219 of the write request is also allocated to another logical block 219 (i.e., logical block 219 which is not a target of the write request). Accordingly, when data is written in the physical block 161, data written in the other logical block 219 which is not a target of the write request is simultaneously rewritten as a result. To prevent the occurrence of such unintended rewriting, aggregated block write processing is carried out. The aggregated block write processing will be described below referring to FIG. 18. Upon execution of the aggregated block write processing, the I/O control module 213 finishes the write command processing (1721).

On the other hand, when it is judged in the step 1711 that the COW bit 304 is "0", the physical block 161 that has been allocated to the target logical block 219 of the write request is not allocated to another logical block 219. In this case, data can be written in the physical block 161 without affecting the logical block 219 which is not a target of the write request. Thus, the process proceeds to the step 1704.

When the step 1704 is executed after the step 1703, the I/O control module 213 writes data specified by the write command in the new physical block 161 reserved in the step 1703 (1704). When the step 1704 is executed after the step 1711, the I/O control module 213 writes the data specified by the write command in the physical block 161 corresponding to the logical block 219 specified by the write command. The physical block 161 corresponding to the logical block 219 specified by the write command is a physical block 161 registered in the entry of the block allocation table 216 corresponding to the logical block 219.

Then, the I/O control module 213 finishes the write command processing (1721).

Figure 18:
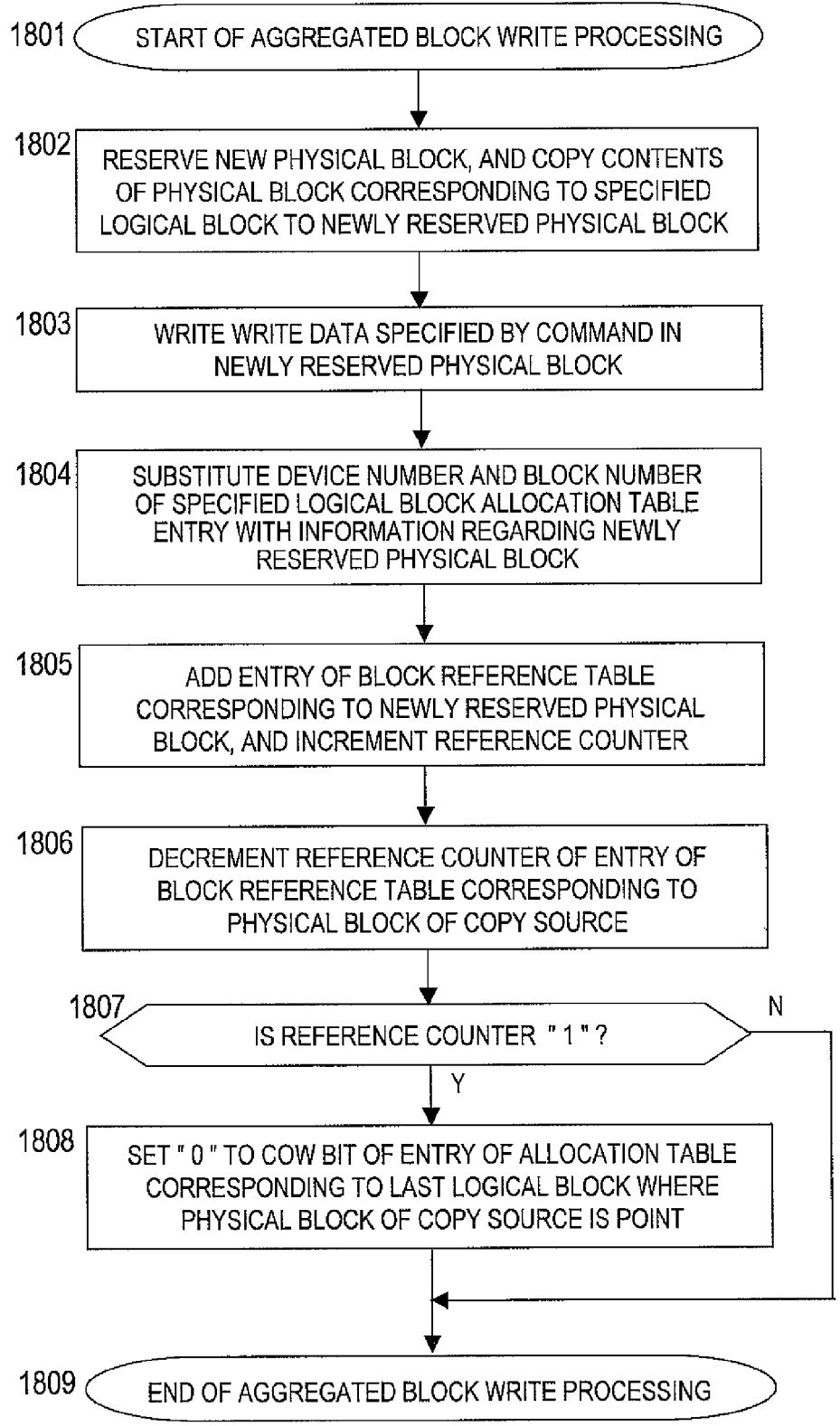
FIG. 18 is a flowchart showing aggregated block write processing executed by the storage system according to the first embodiment of this invention.

FIG. 18 is a flowchart showing aggregated block write processing executed by the storage system 111 according to the first embodiment of this invention.

When it is judged in the step 1711 of FIG. 17 that the COW bit 304 is "1", the I/O control module 213 starts the aggregated block write processing (1801).

First, the I/O control module 213 reserves a new physical block 161, and copies contents of the physical block 161 corresponding to the logical block 219 specified by the write command to the newly reserved physical block 161 (1802). When the entire allocation block 220 is specified as a target of the write request, the copy processing of the step 1802 can be omitted for the allocation block 220. In this case, a new physical block 161 must also be reserved.

Then, the I/O control module 213 writes write data specified by the write command in the new physical block 161 reserved in the step 1802 (1803).

The allocation table management module 215 substitutes the physical device number 302 and the physical block number 303 of the entry of the block allocation table 216 corresponding to the logical block 219 specified by the write command with information indicating the new physical block 161 reserved in the step 1802 (1804).

The allocation table management module 215 adds an entry of the block reference table 217 corresponding to the new physical block 161 reserved in the step 1802, and increments a value of the reference counter 403 of the entry (1805). An initial value of the reference counter 403 of the newly added entry is "0". Accordingly, when the step 1805 is finished, a value of the reference counter 403 of the newly added entry is "1".

Then, the allocation table management module 215 decrements the value of the reference counter 403 of the entry of the block reference table 217 corresponding to the physical block 161 which has become a copy source in the step 1802 (1806).

Then, the allocation table management module 215 judges whether the value of the reference counter 403 corresponding to the physical block 161 of the copy source is "1" (1807).

When it is judged in the step 1807 that the value of the reference counter 403 is "1", the physical block 161 of the copy source has been allocated to only one logical block 219. In this case, the allocation table management module 215 sets a value of the COW bit 304 of the entry of the block allocation table 216 corresponding to the logical block 219 to which the physical block 161 of the copy source has been allocated to "0" (1808), and finishes the processing (1809).

On the other hand, when it is judged in the step 1807 that the value of the reference counter 403 is not "1" (i.e., value of the reference counter 403 is "2" or more), the physical block 161 of the copy source has still been allocated to the plurality of logical blocks 219. In this case, the allocation table management module 215 skips the processing of the step 1808 and finishes the processing (1809).

The first embodiment of this invention has been described by way of example where the server 101 writes the initial data. This is because the writing of the initial data is a typical example of repeatedly writing the same contents in a plurality of places of the storage area. However, even for writing of data other than the initial data, when the same contents are repeatedly written in a plurality of places, this embodiment can be applied thereto.

According to the first embodiment of this invention, when the same data is written in the plurality of logical blocks 219, the same physical block 161 is allocated to the plurality of logical blocks 219. As a result, the number of actually used physical blocks 161 is suppressed, so the storage areas can be saved. Moreover, since the write processing is omitted, the processing can be carried out at a high speed.

Next, a second embodiment of this invention will be described.

A storage application 202 of the second embodiment processes the same write data by a copy command without being aware of an allocation configuration. The storage system that has received the copy command converts copy processing into mapping update processing when possible.

As in the case of the first embodiment, a configuration of a computer system of the second embodiment is as shown in FIGS. 1 to 4, and thus a description thereof will be omitted. According to the second embodiment, processing when a read/write request in a volume 218 is issued is performed as shown in FIGS. 16 to 18, and thus a description thereof will be omitted.

Figure 10:
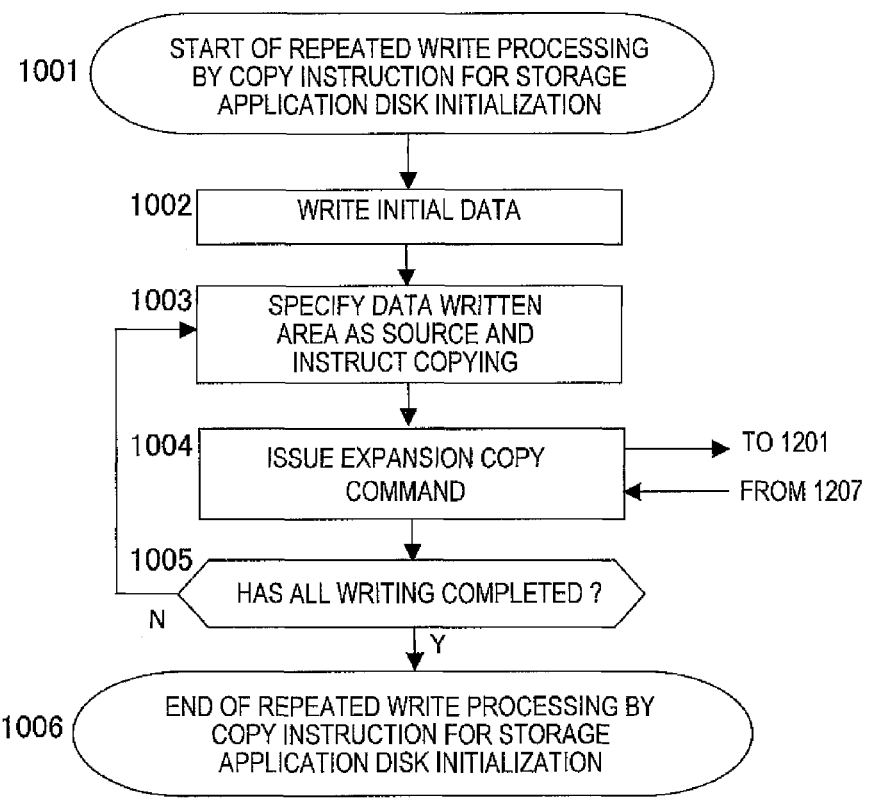
FIG. 10 is a flowchart showing processing executed by a server according to a second embodiment of this invention.

FIG. 10 is a flowchart showing processing executed by a server 101 according to the second embodiment of this invention.

First, the storage application 202 starts processing (1001).

The storage application 202 writes initial data (1002).

The storage application 202 specifies an area where the data has been written in the step 1002 as a source (copy source), and an area where the same contents as those of the source are to be written as a destination (copy destination) to instruct copying to a device driver 203 (1003).

The device driver 203 issues an expansion copy command to the storage system 111 (1004). A format and processing of the expansion copy command will be described below referring to FIGS. 11B and 12.

Subsequently, the steps 1003 to 1005 are repeatedly executed for all the areas where the same contents are to be written, and finishes the processing (1006).

Figure 11A:
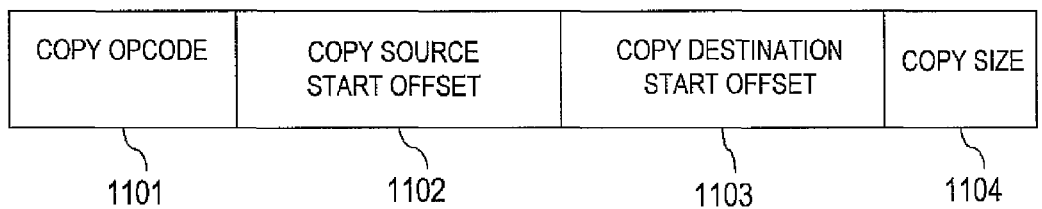
FIG. 11A is an explanatory diagram showing a format of a conventional copy command.

FIG. 11A is an explanatory diagram showing a format 1100 of a conventional copy command.

The format 1100 of the conventional copy command includes a copy opcode 1101 indicating a command type, a copy source start offset 1102, a copy destination start offset 1103, and a copy size 1104. The copy source start offset 1102 and the copy destination start offset 1103 are positional information of a copy source logical block 219 and positional information (e.g., logical block number) of a copy destination logical block 219, respectively. On the other hand, a format 1110 of the expansion copy command of this embodiment is shown in FIG. 11B.

Figure 11B:
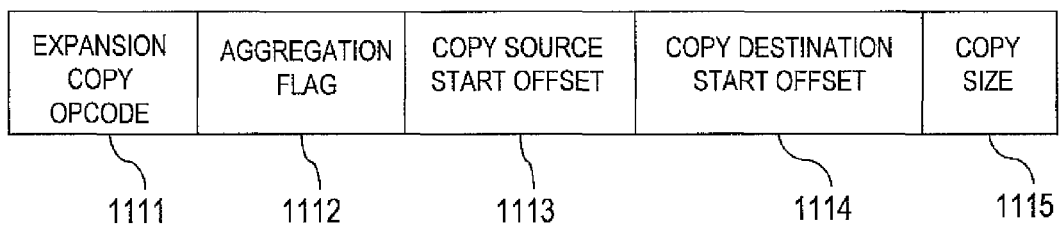
FIG. 11B is an explanatory diagram showing an expansion copy command according to the second embodiment of this invention.

FIG. 11B is an explanatory diagram showing the format 1110 of the expansion copy command according to the second embodiment of this invention.

As compared with the conventional format 1100, an aggregation flag 1112 is added in the format 1110 of the expansion copy command. The aggregation flag 1112 is a flag for deciding whether to permit aggregation when block aggregation is possible. The block aggregation means that a physical block 161 which has been allocated to a logical block 219 is also allocated to another logical block 219.

Copy processing may be executed to improve the reliability and availability of data by providing redundancy to the data. In this case, since block aggregation leads to a loss of redundancy, the aggregation flag 1112 to indicate whether to permit block aggregation is also provided. Thus, the device driver 203 sets the aggregation flag 1112 to "0" when executing copying needing redundancy, and to "1" when executing copying needing no redundancy. For example, the copying needing redundancy is copying to write the initial data described above referring to FIG. 10. The aggregation flag 1112 may be contained in the expansion opcode 1111.

The expansion copy opcode 1111 indicates that the command is an expansion copy command. Since a copy source start offset 1113, a copy destination start offset 1114, and a copy size 1115 are similar to the copy source start offset 1102, the copy destination start offset 1103, and the copy size 1104 of the conventional case, respectively, a description thereof will be omitted.

Figure 12:
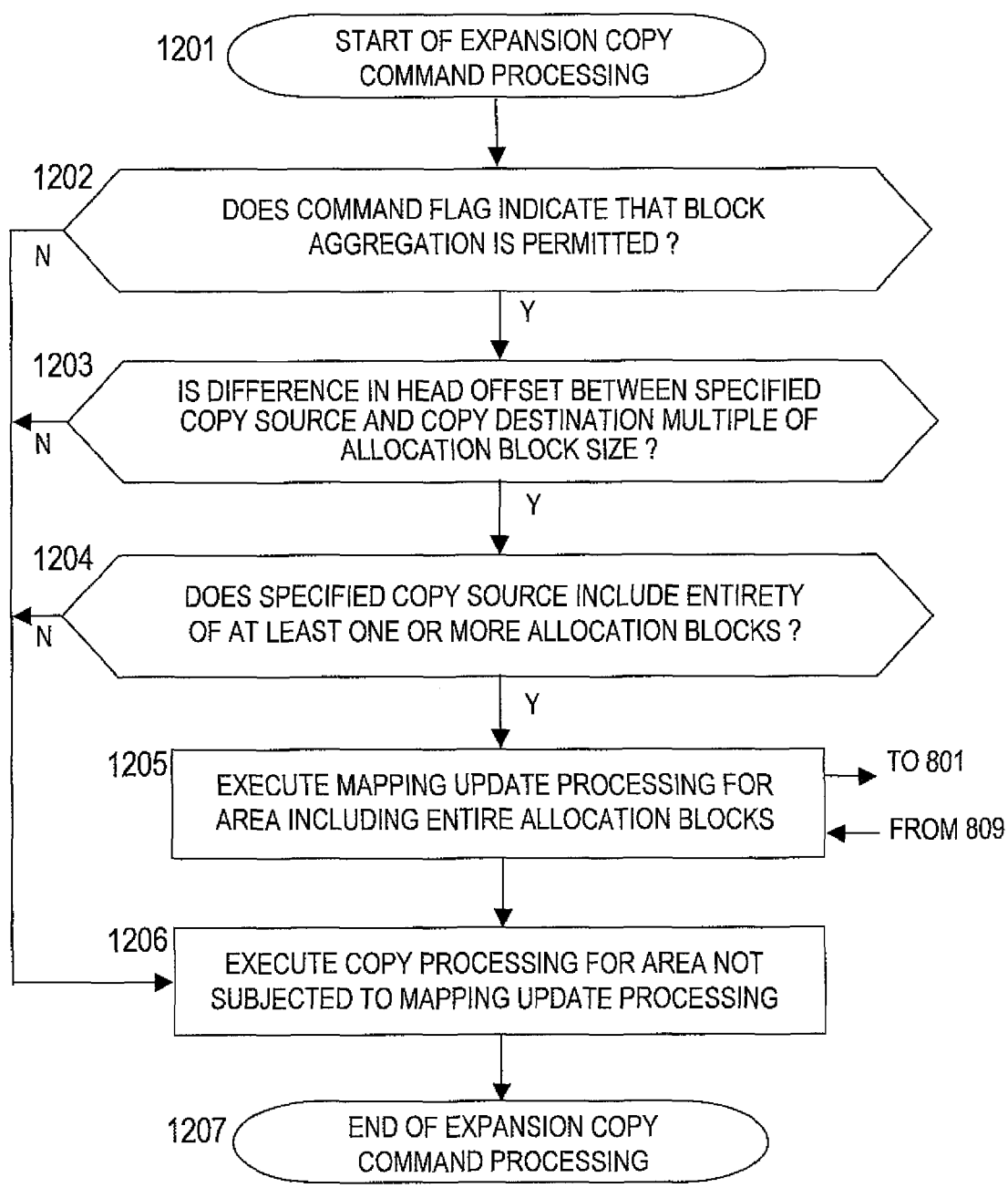
FIG. 12 is a flowchart showing expansion copy command processing executed by a microprogram according to the second embodiment of this invention.

FIG. 12 is a flowchart showing expansion copy command processing executed by a microprogram 211 according to the second embodiment of this invention.

The microprogram 211 that has received the expansion copy command starts the expansion copy command processing (1201).

Then, the microprogram 211 checks the aggregation flag 1112 of the command (1202).

When it is judged in the step 1202 that the aggregation flag 1112 is "0", aggregation is not permitted, and thus the process proceeds to a step 1206. When it is judged in the step 1202 that the aggregation flag 1112 is "1," aggregation is permitted, and thus the process proceeds to a step 1203.

The microprogram 211 judges whether a difference between head offsets of specified copy source and copy destination is a multiple of a size of an allocation block 220 (1203).

When it is judged in the step 1203 that the difference of the head offsets is not a multiple of the size of the allocation block 220, a positional relation between a logical block 219 of the copy destination and the allocation block 220 is different from that between a logical block 219 of the copy source and the allocation block 220. More specifically, for example, when the logical block 219 of the copy source is positioned at a head of the allocation block 220, a logical block 219 of a copy destination of data of the source logical block 219 is positioned at a place other than the head of the allocation block 220. In such a case, the same physical block 161 cannot be allocated to the logical block 219 of the copy source and to the logical block 219 of the copy destination. Thus, the process proceeds to the step 1206.

On the other hand, when it is judged in the step 1203 that the difference of the head offsets is a multiple of the size of the allocation block 220, the same physical block 161 can be allocated to the logical block 219 of the copy source and to the logical block 219 of the copy destination. In this case, the process proceeds to a step 1204.

Then, the microprogram 211 judges whether the entirety of at least one or more allocation blocks 220 is included in a range specified as a copy source (1204).

Allocation of the physical block 161 to the logical block 219 is managed for each allocation block 220. Accordingly, when a logical block 219 which is not a copy source is included in the allocation block 220, if allocation of the physical block 161 to the allocation block 220 is changed, the physical block 161 allocated to the logical block 219 which is not a copy source is also changed. As a result, data stored in the logical block 219 which is not a copy source is changed while not intended. Such a change in allocation of the physical block 161 to the logical block 219 which is not a copy source must be prevented. Thus, for the allocation block 220 including the logical block 219 which is not a copy source, the allocation of the physical block 161 cannot be changed.

When judged as NO in the step 1204, all the allocation blocks 220 each include the logical block 219 which is not a copy source. In this case, the allocation of the physical block 161 cannot be changed, and thus the process proceeds to the step 1206.

On the other hand, when judged as YES in the step 1204, there is at least one allocation block 220 constituted only of logical blocks 219 of copy sources. In this case, the process proceeds to a step 1205.

In the step 1205, the microprogram 211 executes mapping update processing for an area including all the entirety of allocation blocks 220 (each allocation block 220 including only the logical blocks 219 of the copy sources). Details of the mapping update processing are as shown in FIG. 8.

Conventional copy processing is executed for an area whose mapping has not been updated by the processing up to the step 1205 among target areas of the expansion copy command (1206). Specifically, a physical block 161 other than the physical block 161 allocated to the logical block 219 of the copy source is allocated to the logical block 219 of the copy destination, and copy target data is stored in the physical block 161 allocated to the logical block 219 of the copy destination. Alternatively, the copy target data may be stored in the physical block 161 other than the physical block 161 allocated to the logical block 219 of the copy source, and the physical block 161 storing the copy target data may be allocated to the logical block 219 of the copy destination.

Then, the process is finished (1207).

Referring to FIGS. 10 to 12, the example where the storage application 202 writes the initial data has been described. However, the above-mentioned procedure can be applied even to a case where the storage application 202 executes normal copy processing.

For example, when original data stored in the logical block 219 is copied, the storage application 202 does not execute the step 1002. Then, in the step 1003, the storage application 202 specifies the logical block 219 having the original data stored therein as a copy source, and issues a copy instruction which specifies a certain logical block 219 as a copy destination. In the step 1004, the device driver 203 issues an expansion copy command. Processing executed by the storage system 111 that has received the expansion copy command is as described above referring to FIG. 12.

In the case of the method shown in FIGS. 10 to 12, when the number of times of repeating the steps 1003 to 1005 is large, the number of times of command transfer between the server 101 and the storage system 111 is large. As command formats for reducing the number of times of command transfer, there are a format of plural destinations write command shown in FIG. 13, and a format of plural destinations expansion copy command shown in FIG. 14.

Figure 13:
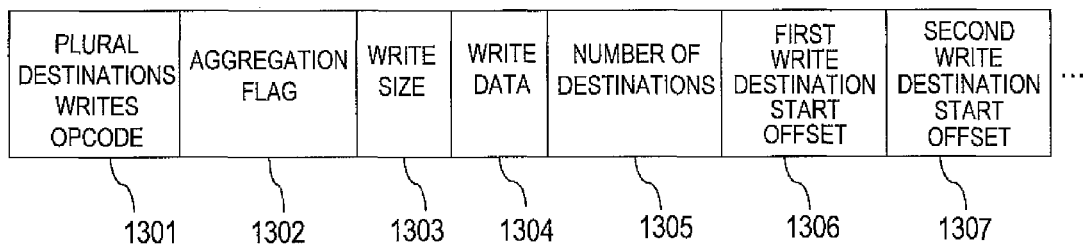
FIG. 13 is an explanatory diagram showing a plural destinations write command according to the second embodiment of this invention.

FIG. 13 is an explanatory diagram showing a plural destinations write command according to the second embodiment of this invention.

The plural destinations write command is a write command specifying a plurality of write destinations. A format 1300 of the plural destinations write command includes a plural destinations write opcode 1301, an aggregation flag 1302, a write size 1303, write data 1304, the number of destinations 1305 indicating the number of write destination areas specified by one command, write destination start offsets 1306, and the like. The number of write destination start offsets 1306 and the like is specified by the number of destination 1305.

The plural destinations write opcode 1301 is a code indicating that the command is a plural destinations write command.

The aggregation flag 1302 indicates whether to permit block aggregation, as in the case of the aggregation flag 1112 of FIG. 11B.

The write size 1303 indicates a size of data written by the plural destinations write command.

The write data 1304 is data written by the plural destinations write command.

The number of destinations 1305 indicates the number of write destination areas by the plural destinations write command. An optional value can be set for the number of destinations 1305.

The write destination start offset 1306 or the like is an offset of a head of each area specified as a write destination. FIG. 13 shows a first write destination start offset 1306 and a second write destination start offset 1307. However, the format 1300 may include a third write destination start offset (not shown) or the like.

When the plural destinations write command shown in FIG. 13 is used, write processing is carried out a predetermined number of times by executing processing of the step 1002 once. As a result, the processing of the steps 1003 to 1005 can be omitted.

Figure 19:
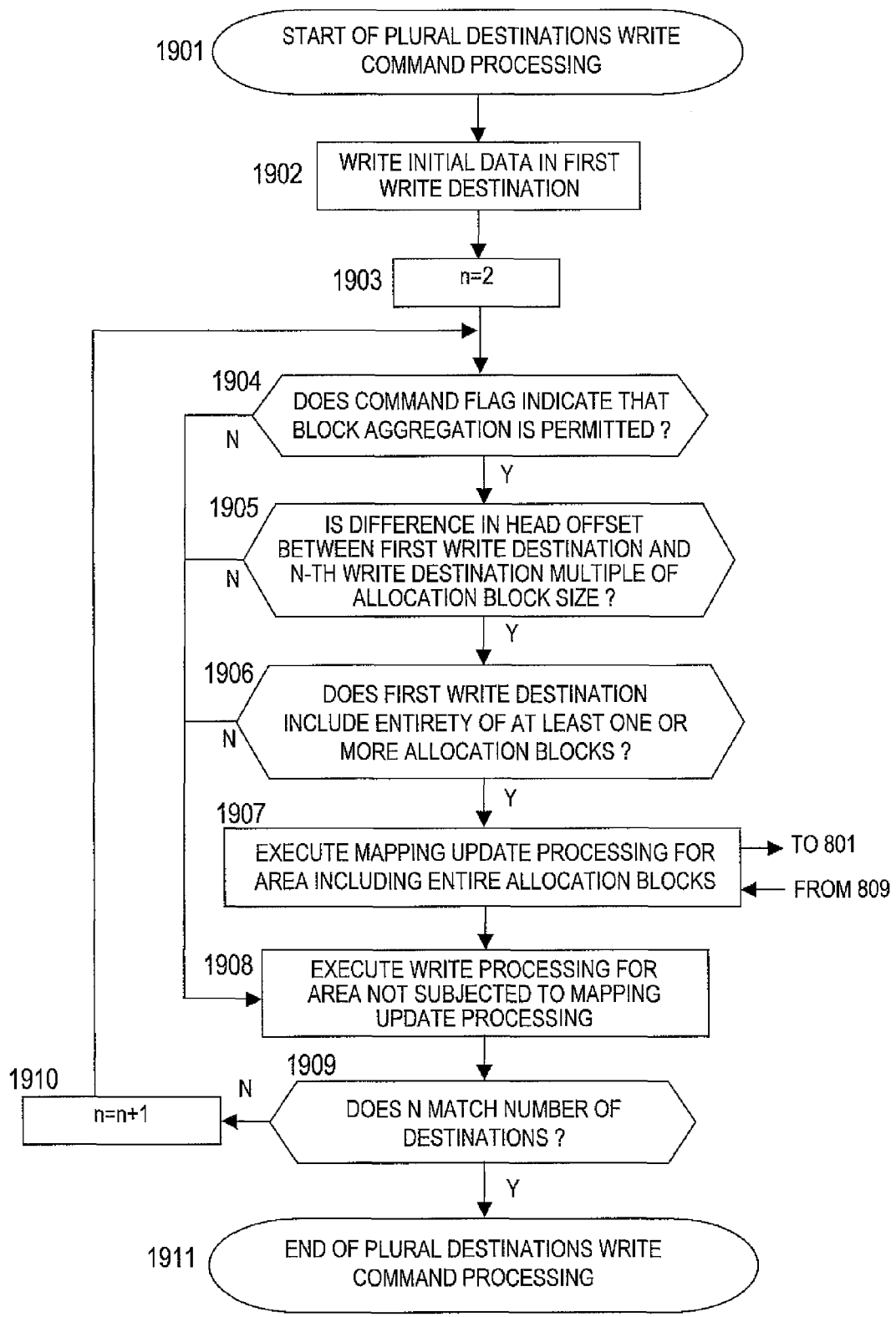
FIG. 19 is a flowchart showing plural destinations write command processing executed by a microprogram according to the second embodiment of this invention.

FIG. 19 is a flowchart showing plural destinations write command processing executed by the microprogram 211 according to the second embodiment of this invention.

The microprogram 211 that has received the plural destinations write command starts plural destinations write command processing (1901).

First, the microprogram 211 writes initial data in a first write destination (i.e., position indicated by the first write destination start offset 1306 specified by a command) (1902).

The microprogram 211 sets n=2 (1903), where n corresponds to an order of command destinations (write destinations). For example, with n=2, writing in a second write destination is executed.

Then, the microprogram 211 checks the aggregation flag 1302 of the command (1904). When the aggregation flag 1302 is judged to be "0", aggregation is not permitted. Thus, the process proceeds to a step 1908. When the aggregation flag 1302 is judged to be "1", aggregation is permitted. Thus, the process proceeds to a step 1905.

In the step 1905, the microprogram 211 judges whether a difference between head offsets of the first write destination and the n-th write destination is a multiple of a size of an allocation block 220. As a result, when it is judged that the difference of the head offsets is not a multiple of the size of the allocation block 220, the process proceeds to the step 1908. On the other hand, when it is judged that the difference of the head offsets is a multiple of the size of the allocation block 220, the process proceeds to a step 1906.

In the step 1906, the microprogram 211 judges whether the entirety of at least one or more allocation blocks 220 is included within a range specified as the first write destination. As a result, when it is judged that the entirety of at least one or more allocation blocks 220 is not included, the process proceeds to the step 1908. On the other hand, when it is judged that the entirety of at least one or more allocation blocks 220 is included, the microprogram 211 executes mapping update processing for an area including the entirety of the allocation blocks 220 (1907). Details of the mapping update processing are as shown in FIG. 8.

The microprogram 211 executes write processing for an area that has not been subjected to mapping update processing (1908).

Then, the microprogram 211 judges whether n matches the number of destinations 1305 of the command (1909).

When n does not match the number of destinations 1305 of the command, a write destination still remains. Thus, the microprogram 211 increments n (2109), and the process returns to the step 1904. As a result, the above-mentioned processing is repeated. On the other hand, when n matches the number of destinations 1305 of the command, writing has been completed in all the write destinations. Thus, the plural destinations write command processing is finished (1911).

Figure 14:
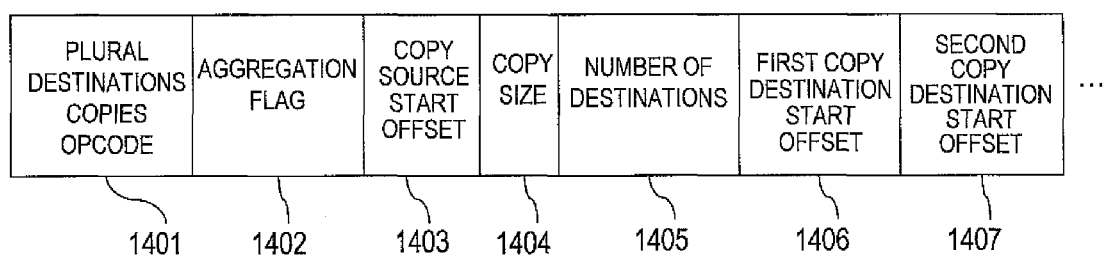
FIG. 14 is an explanatory diagram showing an plural destinations expansion copy command according to the second embodiment of this invention.

FIG. 14 is an explanatory diagram showing a plural destinations expansion copy command according to the second embodiment of this invention.

The plural destinations expansion copy command is a write command specifying a plurality of copy destinations. A format 1400 of the plural destinations expansion copy command includes a plural destinations copy opcode 1401, an aggregation flag 1402, a copy source start offset 1403, a copy size 1404, the number of destinations 1405 indicating the number of copy destination areas specified by one command, and the copy destination start offsets 1406 whose number is specified by the number of destinations 1405, or the like.

The plural destinations copy opcode 1401 is a code indicating that the command is a plural destinations expansion copy command.

The aggregation flag 1402, the copy source start offset 1403, and the copy size 1404 are similar to the aggregation flag 1112, the copy source start offset 1113, and the copy size 1115, respectively. Thus, a description thereof will be omitted.

The number of destinations 1405 indicates the number of copy destination areas by the plural destinations expansion copy command. An optional value can be set for the number of destinations 1405.

The copy destination start offset 1406 or the like is an offset of a head of each area specified as a copy destination. FIG. 14 shows a first copy destination start offset 1406 and a second copy destination start offset 1407. However, the format 1400 may include a third copy destination start offset (not shown) or the like.

When the plural destinations expansion copy command shown in FIG. 14 is used, copy processing is carried out a predetermined number of times by executing processing of the steps 1003 to 1005 once. As a result, the repeated processing of the steps 1003 to 1005 can be omitted.

Figure 20:
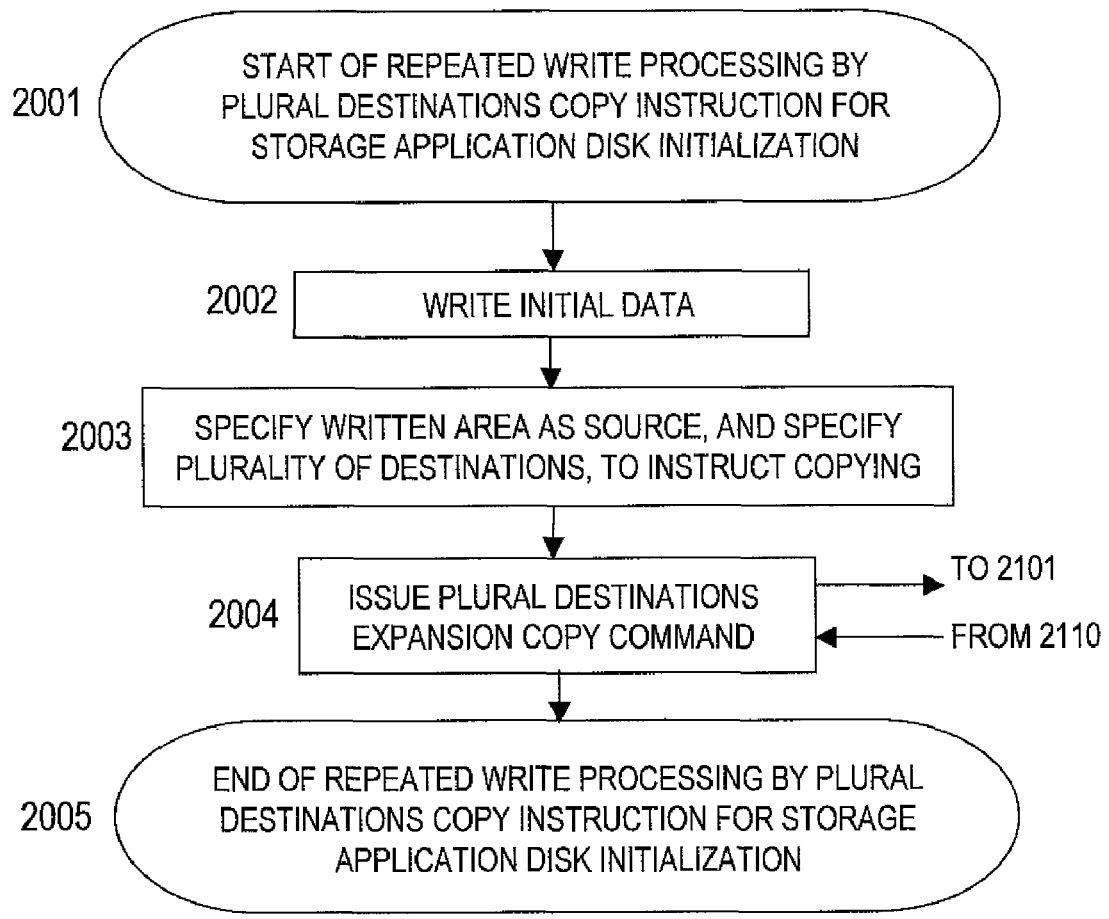
FIG. 20 is a flowchart showing processing where the server uses the plural destinations expansion copy command according to the second embodiment of this invention.

FIG. 20 is a flowchart showing processing where the server 101 uses the plural destinations expansion copy command according to the second embodiment of this invention.

First, the storage application 202 starts processing (2001).

The storage application 202 writes initial data (2002).

The storage application 202 specifies an area where the data has been written in the step 2002 as a source (copy source), specifies an area where the same contents as those of the source are to be written as a destination (copy destination), and instructs copying to the device driver 203 (2003). In this case, if there are a plurality of areas where the same contents are to be written, the plurality of areas are specified as destinations.

The device driver 203 issues a plural destinations expansion copy command to the storage system 111 (2004). The format of the plural destinations expansion copy command is as shown in FIG. 14. Processing executed by the storage system 111 that has received the plural destinations expansion copy command is as shown in FIG. 21.

Then, the processing of FIG. 20 is finished (2005).

Figure 21:
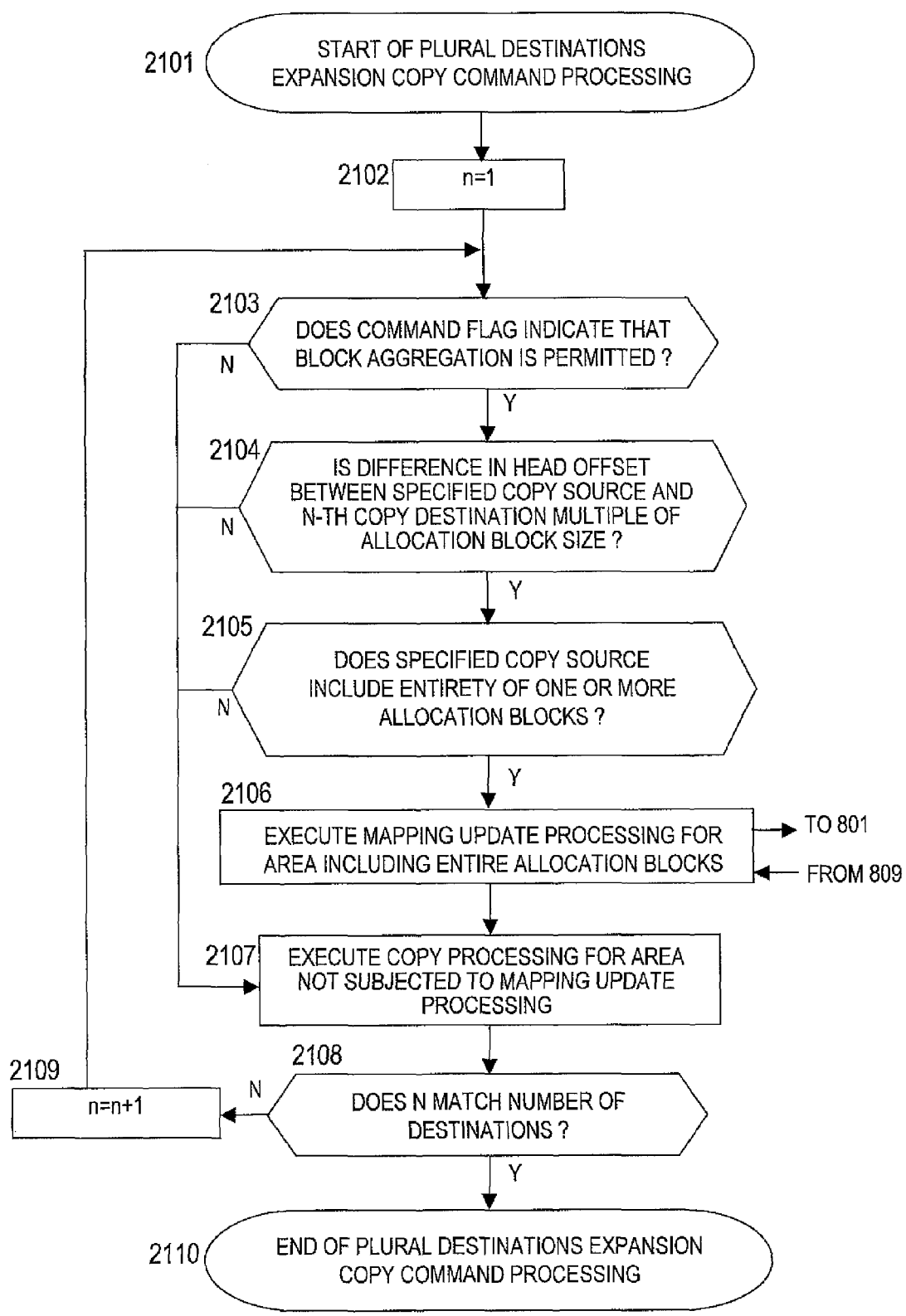
FIG. 21 is a flowchart showing the plural destinations expansion copy command processing executed by the microprogram according to the second embodiment of this invention.

FIG. 21 is a flowchart showing plural destinations expansion copy command processing executed by the microprogram 211 according to the second embodiment of this invention.

The microprogram 211 that has received the plural destinations expansion copy command starts plural destinations expansion copy command processing (2101).

First, the microprogram 211 sets n=1 (2102), where n corresponds to an order of copy destinations of the command. For example, with n=1, copying in a first copy destination is executed.

Then, the microprogram 211 checks the aggregation flag 1402 of the command (2103). When the aggregation flag 1402 is judged to be "0", aggregation is not permitted. Thus, the process proceeds to a step 2107. When the aggregation flag 1402 is judged to be "1", aggregation is permitted. Thus, the process proceeds to a step 2104.

In the step 2104, the microprogram 211 judges whether a difference between head offsets of the specified copy source and destination is a multiple of a size of an allocation block 220. When it is judged that the difference of the head offsets is not a multiple of the size of the allocation block 220, the process proceeds to the step 2107. On the other hand, when it is judged that the difference of the head offsets is a multiple of the size of the allocation block 220, the process proceeds to a step 2105.

In the step 2105, the microprogram 211 judges whether the entirety of at least one or more allocation blocks 220 is included within a range specified as a copy source. When it is judged that the entirety of at least one or more allocation blocks 220 is not included, the process proceeds to the step 2107. On the other hand, when it is judged that the entirety of at least one or more allocation blocks 220 is included, the microprogram 211 executes mapping update processing for an area including the entirety of the allocation blocks 220 (2106). Details of the mapping update processing are as shown in FIG. 8.

The microprogram 211 executes copy processing for an area that has not been subjected to mapping update processing (2107).

Then, the microprogram 211 judges whether n matches the number of destinations 1405 of the command (2108).

When n does not match the number of destinations 1405 of the command, a copy destination still remains. Thus, the microprogram 211 increments n (2109), and the process returns to the step 2103. As a result, the above-mentioned processing is repeated. On the other hand, when n matches the number of destinations 1405 of the command, copying has been completed in all the copy destinations. Thus, the plural destinations expansion copy command processing is finished (2110).

According to the second embodiment, as in the case of the first embodiment, storage areas can be saved, and the processing can be carried out at a high speed. According to the second embodiment, the change of the allocation of the physical block 161 to the logical block 219 is executed by the storage system 111 which has received the copy request. Thus, it is not necessary for the server 101 to control allocation of the physical block 161 to the logical block 219.

Next, a third embodiment of this invention will be described.

A user application 201 of the third embodiment uses fcntl or the like to instruct copying to a storage application 202, and the storage application 202 that has received the instruction issues an expansion copy command by a method similar to that of the second embodiment.

A configuration of a computer system of the third embodiment is as shown in FIGS. 1 to 4 as in the case of the first embodiment, and thus a description thereof will be omitted. According to the third embodiment, processing when a read/write request in a volume 218 is issued is performed as shown in FIGS. 16 to 18, and thus a description thereof will be omitted.

Figure 15:
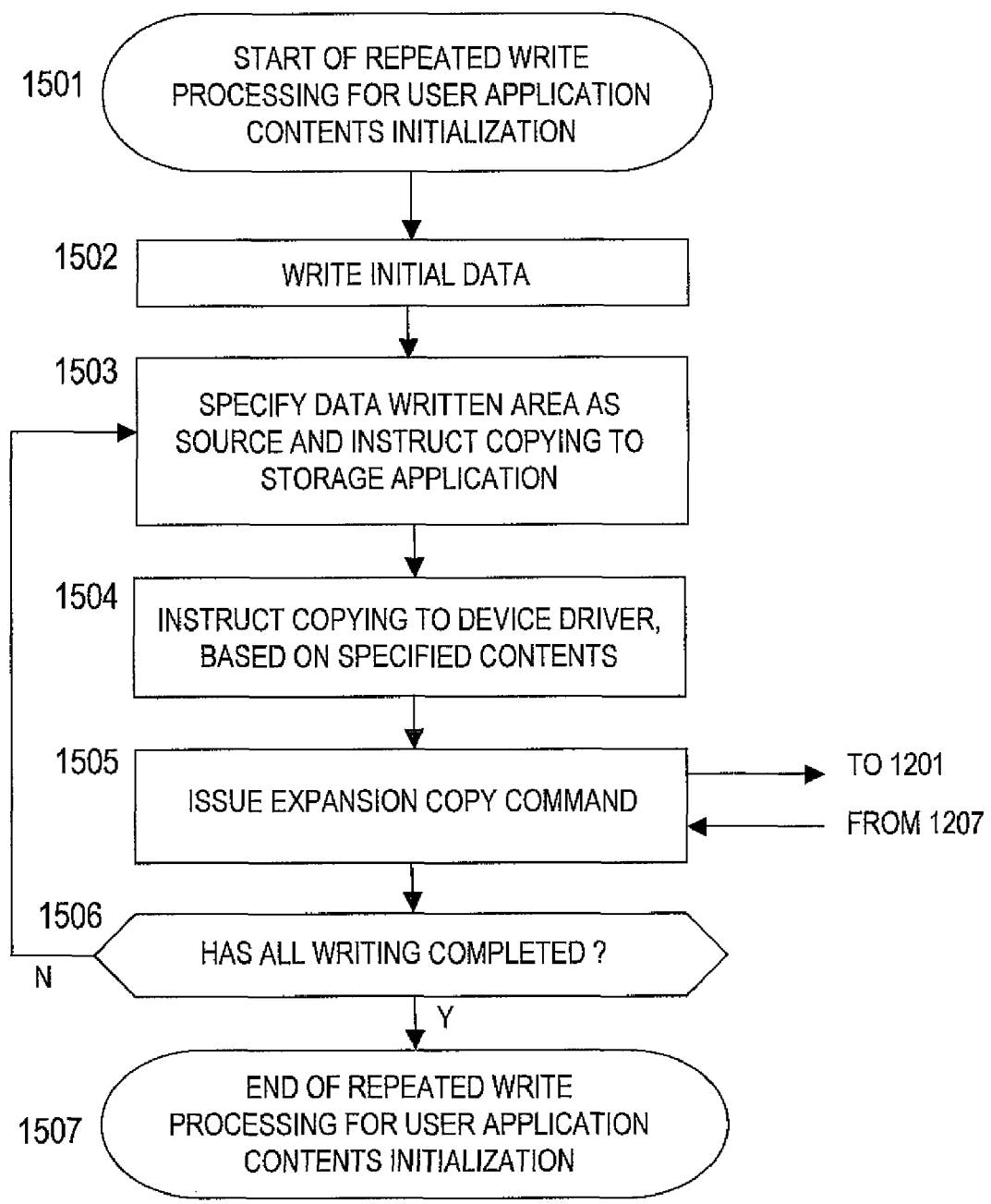
FIG. 15 is a flowchart showing processing executed by a server according to a third embodiment of this invention.

FIG. 15 is a flowchart showing processing executed by a server 101 according to the third embodiment of this invention.

Upon a start of processing (1501), the user application 201 writes initial data (1502).

The user application 201 specifies an area where the initial data has been written in the step 1502 as a source, and instructs copying to the storage application 202 by using fcntl or the like (1503).

The storage application 202 instructs the copying specified in the step 1503 to a device driver 203 (1504).

The device driver 203 issues an expansion copy command to a storage system 111 (1505). Processing executed by the storage system 111 that has received the expansion copy command is as described above referring to FIG. 12.

Then, the steps 1503 to 1506 are repeated for all the areas where the same contents are to be written to finish the processing (1507).

Referring to FIG. 15, the example where the user application 201 writes the initial data has been described. However, as in the case of the second embodiment, the above-mentioned procedure can be applied even to a case where the user application 201 executes normal copy processing.

For example, when original data which has already been stored in a logical block 219 is copied, the user application 201 does not execute the step 1502. In the step 1503, the user application 201 specifies the logical block 219 having the original data stored therein as a copy source, and issues a copy instruction specifying a certain logical block 219 as a copy destination. The device driver 203 issues an expansion copy command in the step 1505. Processing executed by the storage system 111 that has received the expansion copy command is as shown in FIG. 12.

According to the third embodiment, as in the case of the first and second embodiments, even when the user application 201 initializes contents, storage areas can be saved, and processing can be carried out at a high speed.

The first to third embodiments of this invention can be widely applied to the computer system including the storage system.

What is claimed is:

1. A computer system, comprising:
a server; and
a storage system, wherein:
the server includes:
an interface coupled to the storage system;
a processor coupled to the interface; and
a memory coupled to the processor;
the storage system includes:
a disk drive for storing data; and
a controller for controlling the disk drive;
the storage system manages a physical storage area of the disk drive for each of a plurality of physical blocks of predetermined sizes;
the storage system manages allocation of the plurality of physical blocks to a plurality of logical blocks of predetermined sizes;
the plurality of physical blocks include at least one first physical block and at least one second physical block different from the first physical block;
the plurality of logical blocks include at least one first logical block and one or more second logical blocks; and
the storage system
stores data written in the first logical block in the first physical block allocated to the first logical block,
judges, upon reception of a request for copying data stored in the first logical block to the second logical block, whether further allocation of the first physical block to the second logical block is permitted or not based on information included in the request for copying data,
further allocates the first physical block to the second logical block when it is judged that further allocation of the first physical block to the second logical block is permitted based on the information, and
allocates the second physical block to the second logical block to store target data of the request for copying in the second physical block when it is judged that further allocation of the first physical block to the second logical block is not permitted based on the information.

2. The computer system according to claim 1, wherein:
the storage system manages allocation of at least one of the physical blocks to at least one of the logical blocks for each allocation block comprised of a predetermined number of logical blocks; and compares, when it is judged that further allocation of the first physical block to the second logical block is permitted based on the information, a positional relation between the first logical block specified by the request for copying and a head of the allocation block with a positional relation between the second logical block specified by the request for copying and a head of the allocation block, further allocates the first physical block to the second logical block when the compared positional relations are identical, and allocates the second physical block to the second logical block to store target data of the request for copying in the second physical block when the compared positional relations are not identical.

3. The computer system according to claim 2, wherein the storage system judges whether the allocation block includes a logical block which is not a target of the request for copying when the compared positional relations are identical, further allocates the first physical block to the second logical block when the allocation block includes no logical block other than a target of the request for copying, and allocates the second physical block to the second logical block to store data of a target of the request for copying in the second physical block when the allocation block includes a logical block other than a target of the copy request for copying.

4. The computer system according to claim 1, wherein the storage system reads data stored in the first physical block to return the read data to a request source, upon reception of a read request targeting the second logical block to which the first physical block is allocated.

5. The computer system according to claim 1, wherein:

the plurality of physical blocks include a third physical block different from the first physical block; and the storage system judges, upon reception of a write request targeting the logical block to which the first physical block is allocated, whether the first physical block is allocated to a logical block which is not a target of the write request, copies data stored in the first physical block to the third physical block when it is judged that the first physical block has been allocated to the logical block which is not a target of the write request, writes target data of the write request in the third physical block to which the data stored in the first physical block has been copied, and allocates the third physical block to the target logical block of the write request.

6. A storage system coupled to a server, comprising:

a disk drive for storing data; and a controller for controlling the disk drive, wherein:

the controller manages a physical storage area of the disk drive for each of a plurality of physical blocks of predetermined sizes, and manages allocation of the plurality of physical blocks to a plurality of logical blocks of predetermined sizes;

the plurality of physical blocks include at least one first physical block and at least one second physical block different from the first physical block;

the plurality of logical blocks include at least one first logical block and one or more second logical blocks; and the controller stores data written in the first logical block in the first physical block allocated to the first logical block, refers to, upon reception of a request for copying data stored in the first logical block to the second logical block, a flag included in the request, further allocates the first physical block to the second logical block when the flag indicates permission of further allocation of the first physical block to the second logical block, and allocates the second physical block to the second logical block to store target data of the request for copying in the second physical block when the flag indicates nonpermission of further allocation of the first physical block to the second logical block.

7. The storage system according to claim 6, wherein:

the controller manages allocation of the physical block to the logical block for each allocation block comprised of a predetermined number of logical blocks;

compares, when the flag indicates permission of further allocation of the first physical block to the second logical block, a positional relation between the first logical block specified by the request for copying and a head of the allocation block with a positional relation between the second logical block specified by the request for copying and a head of the allocation block, further allocates the first physical block to the second logical block when the compared positional relations are identical, and allocates the second physical block to the second logical block to store target data of the request for copying in the second physical block when the compared positional relations are not identical.

8. The storage system according to claim 6, wherein the controller judges whether the allocation block includes a logical block which is not a target of the request for copying when the compared positional relations are identical, further allocates the first physical block to the second logical block when the allocation block includes no logical block other than a target of the request for copying, and allocates the second physical block to the second logical block to store data of a target of the request for copying in the second physical block when the allocation block includes a logical block other than a target of the copy request for copying.

9. The storage system according to claim 6, wherein the controller reads data stored in the first physical block to return the read data to a request source, upon reception of a read request targeting the second logical block to which the first physical block is allocated.

10. The storage system according to claim 6, wherein:

the plurality of physical blocks include a third physical block different from the first physical block; and the controller judges, upon reception of a write request targeting the logical block to which the first physical block is allocated, whether the first physical block is allocated to a logical block which is not a target of a write request, copies data stored in the first physical block to the third physical block when it is judged that the first physical block has been allocated to the logical block which is not a target of the write request, writes target data of the write request in the third physical block to which the data stored in the first physical block has been copied, and allocates the third physical block to the target logical block of the write request.

11. A method of controlling a computer system, the computer system comprising a server and a storage system,
the server including an interface coupled to the storage system, a processor coupled to the interface, and a memory coupled to the processor,
the storage system including a disk drive for storing data, and a controller for controlling the disk drive, managing a physical storage area of the disk drive for each of a plurality of physical blocks of predetermined sizes, and managing allocation of the plurality of physical blocks to a plurality of logical blocks of predetermined sizes,
the plurality of physical blocks including at least one first physical block and at least one second physical block different from the first physical block,
the plurality of logical blocks including at least one first logical block and one or more second logical blocks,
the method comprising:
storing data written in the first logical block in the first physical block allocated to the first logical block;
referring to a flag included in a request when the storage system receives a request for copying data stored in the first logical block to the second logical block;
further allocating the first physical block to the second logical block when the flag indicates permission of further allocation of the first physical block to the second logical block; and
allocating the second physical block to the second logical block to store target data of the request for copying in the second physical block when the flag indicates nonpermission of further allocation of the first physical block to the second logical block.

12. The method according to claim 11, further comprising:
managing allocation of the physical block to the logical block for each allocation block comprised of a predetermined number of logical blocks;
comparing, when the flag indicates permission of further allocation of the first physical block to the second logical block, a positional relation between the first logical block specified by the request for copying and a head of the allocation block with a positional relation between the second logical block specified by the request for copying and a head of the allocation block,
further allocating the first physical block to the second logical block when the compared positional relations are identical, and
allocating the second physical block to the second logical block to store target data of the request for copying in the second physical block when the compared positional relations are not identical.

13. The method according to claim 12, further comprising:
judging whether the allocation block includes a logical block which is not a target of the request for copying when the compared positional relations are identical;
further allocating the first physical block to the second logical block when the allocation block includes no logical block other than a target of the request for copying; and
allocating the second physical block to the second logical block to store data of a target of the request for copying in the second physical block when the allocation block includes a logical block other than a target of the copy request for copying.

14. The method according to claim 11, further comprising reading data stored in the first physical block to return the read data to a request source when the storage system receives a read request targeting the second logical block to which the first physical block is allocated.

15. The method according to claim 11, wherein:
the plurality of physical blocks include a third physical block different from the first physical block; and
the method further comprising:
judging, when the storage system receives a write request targeting the logical block to which the first physical block is allocated, whether the first physical block is allocated to a logical block which is not a target of the write request,
copying data stored in the first physical block to the third physical block when it is judged that the first physical block has been allocated to the logical block which is not a target of the write request,
writing target data of the write request in the third physical block to which the data stored in the first physical block has been copied, and
allocating the third physical block to the target logical block of the write request.

* * * * *